(12) United States Patent
Jikihara et al.

(10) Patent No.: US 9,346,020 B2
(45) Date of Patent: May 24, 2016

(54) MULTILAYERED CHARGE-MOSAIC MEMBRANE AND MANUFACTURING METHOD THEREFOR

(75) Inventors: Atsushi Jikihara, Kurashiki (JP); Kenichi Kobayashi, Kurashiki (JP); Mitsuru Higa, Ube (JP)

(73) Assignees: KURARAY CO., LTD., Kurashiki-shi (JP); YAMAGUCHI UNIVERSITY, Yamaguchi-shi (JP)

( * ) Notice: Subject to any disclaimer, the term of this patent is extended or adjusted under 35 U.S.C. 154(b) by 601 days.

(21) Appl. No.: 13/519,499

(22) PCT Filed: Dec. 27, 2010

(86) PCT No.: PCT/JP2010/073589
§ 371 (c)(1),
(2), (4) Date: Jun. 27, 2012

(87) PCT Pub. No.: WO2011/081145
PCT Pub. Date: Jul. 7, 2011

(65) Prior Publication Data
US 2012/0285881 A1 Nov. 15, 2012

(30) Foreign Application Priority Data

Dec. 28, 2009 (JP) .................................. 2009-298285
Sep. 29, 2010 (JP) .................................. 2010-220042

(51) Int. Cl.
*B01D 71/00* (2006.01)
*B01D 69/10* (2006.01)
(Continued)

(52) U.S. Cl.
CPC ................ *B01D 69/10* (2013.01); *B01D 69/02* (2013.01); *B01D 69/12* (2013.01); *B01D 71/80* (2013.01); *B01D 71/82* (2013.01); *B01D 2325/18* (2013.01)

(58) Field of Classification Search
CPC .............. B01D 5/00; B01D 5/08; B01D 5/10; B01D 5/20; B01D 5/26; B01D 5/36; B01D 5/361; B01D 63/08; B01D 63/081; B01D 67/00; B01D 67/0002; B01D 69/02; B01D 69/06; B01D 69/10; B01D 69/105; B01D 69/12; B01D 69/122; B01D 69/125; B01D 69/14; B01D 69/141; B01D 69/142; B01D 69/148; B01D 71/00; B01D 71/06; B01D 71/78; B01D 71/80; B01D 71/82; B01D 2239/00; B01D 2239/02; B01D 2325/14; B01D 2325/16; B01D 2325/18; B01D 2325/36; B01D 2325/42
USPC .................. 210/90, 483, 488, 489, 490, 492, 210/500.21, 500.27, 500.42
See application file for complete search history.

(56) References Cited

U.S. PATENT DOCUMENTS 4,565,854 A  1/1986  Sato et al.
5,304,307 A * 4/1994  Linder et al. .................. 210/490

(Continued)

FOREIGN PATENT DOCUMENTS

JP    59 187003    10/1984
JP    59 189113    10/1984

(Continued)

OTHER PUBLICATIONS

Machine Translation JP 2006-272067A, original document provided by Applicant in file.*

(Continued)

*Primary Examiner* — Allison Fitzsimmons
(74) *Attorney, Agent, or Firm* — Oblon, McClelland, Maier & Neustadt, L.L.P.

(57) ABSTRACT

There is provided a multilayered charge-mosaic membrane having a porous supporting layer (A), a porous intermediate layer (B) and a charge-mosaic layer (C), wherein the porous supporting layer (A), the porous intermediate layer (B) and the charge-mosaic layer (C) are located in this order; the porous supporting layer (A) and/or the porous intermediate layer (B) are made of a fiber layer containing hydrophilic fibers; a thickness of the porous intermediate layer (B) is 0.1 to 100 μm; a porosity of the porous supporting layer (A) is larger than a porosity of the porous intermediate layer (B); the cationic and/or the anionic polymers constituting the charge-mosaic layer (C) is a polyvinyl alcohol having an ionic group. Thus, there is provided a multilayered charge-mosaic membrane having a large salt permeation flux and excellent mechanical strength.

10 Claims, 1 Drawing Sheet

(51) Int. Cl.
*B01D 69/02* (2006.01)
*B01D 69/12* (2006.01)
*B01D 71/80* (2006.01)
*B01D 71/82* (2006.01)
*B01D 15/36* (2006.01)

(56) References Cited

U.S. PATENT DOCUMENTS

| | | |
|---|---|---|
| 2008/0149561 A1 | 6/2008 | Chu et al. |
| 2009/0110907 A1* | 4/2009 | Jiang ............... B01D 53/228 428/315.9 |
| 2012/0031834 A1 | 2/2012 | Higa et al. |
| 2012/0034481 A1 | 2/2012 | Higa et al. |
| 2012/0035280 A1 | 2/2012 | Jikihara et al. |

FOREIGN PATENT DOCUMENTS

| | | |
|---|---|---|
| JP | 59 203613 | 11/1984 |
| JP | 1 199625 | 8/1989 |
| JP | 8 155281 | 6/1996 |
| JP | 8 276122 | 10/1996 |
| JP | 2006 272067 | 10/2006 |
| JP | 2006 297338 | 11/2006 |
| JP | 2008 188518 | 8/2008 |
| JP | 2009 233550 | 10/2009 |

OTHER PUBLICATIONS

Higa et al., (2008, J. Membr. Sci., 310, 466-473).*
IUPAC (1974, Basic Definitions of Terms Relating to Polymers).*
Higa, M., et al., "Charge mosaic membranes prepared from laminated structures of PVA-based charged layers 1. Preparation and transport properties of charged mosaic membranes," Journal of Membrane Science, vol. 310, pp. 466-473, (2008).
"The proceedings of the Annual Meeting of the Society of Fiber Science and Technology," Fiber Preprints, vol. 56, No. 1, p. 33, (2001).
International Search Report Issued Apr. 12, 2011 in PCT/JP10/73589 Filed Dec. 27, 2010.
Extended European Search Report in Application No. 10841001.0-1356, issued Jun. 16, 2015.

* cited by examiner

MULTILAYERED CHARGE-MOSAIC MEMBRANE AND MANUFACTURING METHOD THEREFOR

TECHNICAL FIELD

The present invention relates to a multilayered charge-mosaic membrane and a manufacturing method therefor.

BACKGROUND ART

A charge-mosaic membrane is a membrane having a charge structure comprised of cation-exchange domains and anion-exchange domains which are alternately aligned and each of which penetrates the membrane from one side to the other side. Such a charge structure of a charge-mosaic membrane can accelerate permeation of low-molecular-weight ions in a given solution without applying an external current. With cation-exchange domains and anion-exchange domains being alternately aligned, an electric circuit in which salt solution positioned on both sides of the membrane act as resistances is formed because these domains have a mutually opposite charge. When cations and anions are supplied to the circuit through cation-exchange domains and anion-exchange domains like a current applied to it, respectively, a circulating current is generated, so that salt transport is promoted. It means that a charge-mosaic membrane itself has an inherent mechanism for causing ion transport in contrast to an ion-exchange membrane with a single fixed charge which requires an external current.

There have been reported charge-mosaic membranes produced by various processes. Patent Reference 1 has described a method for desalination an organic compound using a charge-mosaic membrane prepared utilizing a microphase separation phenomenon in a block copolymer. However, a method for producing a charge-mosaic membrane utilizing microphase separation phenomenon of a block copolymer requires advanced technique for producing a block copolymer having a desired structure and a troublesome process, and is so costly that an industrially practicable and large-area charge-mosaic membrane cannot be efficiently produced at low cost. Furthermore, it is difficult to form a structure in which cation-exchange domains and anion-exchange domains penetrate a membrane from one side to the other side, respectively, leading to difficulty in achieving high salt permselectivity.

Patent Reference 2 has described a process for producing a charge-mosaic membrane, comprising mixing a membrane-forming polymer, a solvent capable of dissolving the membrane-forming polymer, a cation-exchange resin and an anion-exchange resin to prepare a homogeneous polymer dispersion in which the cation-exchange resin and the anion-exchange resin are dispersed in a polymer solution; coating and extending the polymer dispersion to a substrate; drying it to be solidified; removing a solvent from the film thus obtained and washing the membrane. It is described that a charge-mosaic membrane prepared by the process exhibits increase in an amount of permeating salts with increase in a pressure as measured in a piezodialysis experiment. However, in this charge-mosaic membrane, water or a neutral solute leaks in an interface between a membrane matrix and an ion-exchange resin. Furthermore, it is difficult to form a structure in which cation-exchange domains and anion-exchange domains penetrate a membrane from one side to the other side, respectively, leading to difficulty in achieving high salt permselectivity.

Patent Reference 3 has described a process for producing a charge-mosaic membrane consisting of cationic polymer domains and anionic polymer domains wherein in a crosslinked continuous phase formed by an ionic (either cationic or anionic) polymer, a polymer at least having ionicity opposite to the continuous-phase forming polymer is dispersed as crosslinked particles with an average particle size of 0.01 to 10 μm. The process comprises forming a membrane using a dispersion prepared by dispersing, in a solution of an either ionic polymer forming the continuous phase in the membrane, spherical polymer particles with at least ionicity opposite to the continuous-phase forming polymer; then crosslinking at least the continuous phase in the membrane; and then immersing the membrane in water or an aqueous solution. For a membrane prepared by this process, a domain size and a thickness can be easily controlled and as the most advantageous feature, a membrane with a large area can be relatively easily prepared. This manufacturing process has a problem that the necessity of preparing polymer particles with a small average particle size requires advanced technique and a longer period. Furthermore, since the charge-mosaic membrane thus prepared contains a microgel with a high water content, it exhibits quite poor pressure resistance. In particular, it has a structure in which interfacial adhesion between the membrane matrix and the positive/negative microgel is insufficient. Therefore, a charge-mosaic membrane exhibiting higher electrolyte permeability and mechanical strength is inadequate. Therefore, although the membrane can be used as a membrane for diffusion dialysis, it cannot be used as a membrane for piezodialysis or exhibits extremely poor durability. Furthermore, it is difficult to form a structure in which one ionic polymer dispersed as spherical particles penetrates a membrane from one side to the other side, leading to difficulty in achieving high salt permselectivity.

Patent Reference 4 has described a charge-mosaic membrane consisting of a cationic polymer, an anionic polymer and a support, wherein the support is an asymmetric porous body and both polymers are filled in the support for dialysis; in which a suitable aspect is a charge-mosaic membrane produced by filling a support with a polymer-particle mixed dispersion prepared by mixing a cationic and an anionic spherical polymers. As described in the reference, there can be provided a large-area charge-mosaic membrane with improved pressure resistance and mechanical strength which can separate electrolytes from nonelectrolytes or desalt a salt solution, by a straightforward process. However, in a charge-mosaic membrane thus prepared, performance of salt permselectivity is insufficient and a cationic polymer and an anionic polymer may not be tightly bonded to a support. Thus, there is room for improvement.

Non-patent Reference 1 has described a charge-mosaic membrane prepared by a lamination method. In this lamination method, cation-exchange membranes are prepared from polyvinyl alcohol and a polyanion, and anion-exchange membranes are prepared from polyvinyl alcohol and a polycation, respectively, and these are alternately laminated via polyvinyl alcohol as an adhesive to form a laminated charged block. The block is cut by a laboratory cutter perpendicularly to the lamination plane and crosslinked to give a laminated charge-mosaic membrane with a thickness of about 150 μm. It is described that a laminated charge-mosaic membrane thus prepared has a KCl-salt flux ($J_{KCl}$) of $3.0\times10^{-9}$ mol·cm$^{-2}$·s$^{-1}$ and an electrolyte permselectivity ($\alpha$) of 2300, which means that the membrane is very permselective. A tensile strength is 5.7 MPa in a direction parallel to a charged layer while being 2.7 MPa in a vertical direction, indicating that the membrane can be used for diffusion dialysis but must be stronger for piezodialysis applications.

Non-patent Reference 2 has described a charge-mosaic membrane prepared by a polymer blend method using polyvinyl alcohol as a membrane matrix. In the polymer blend method, to an aqueous solution of a modified PVA polyanion containing polyvinyl alcohol and a vinyl compound having an itaconic group as 2 mol % copolymerization composition is added hydrochloric acid to acidify the solution for preventing dissociation of hydrogen ion from a carboxyl moiety in an itaconic group. To the solution are added polyvinyl alcohol and an aqueous solution of polyallylamine hydrochloride to prepare an aqueous solution of blended polymers. This solution is cast on, for example, a glass plate to form a film, which is then chemically crosslinked to provide a charge-mosaic membrane. It is described that a charge-mosaic membrane thus obtained has a KCl-salt flux ($J_{KCl}$) of $1.7 \times 10^{-8}$ mol·$cm^{-2} \cdot s^{-1}$ and an electrolyte permselectivity ($\alpha$) of 48, but a further higher electrolyte permselectivity is required. Furthermore, there is a problem that salt permselectivity is reduced in an acidic solution.

PRIOR ART REFERENCES

Patent References

Patent Reference 1: JP 59-203613 A
Patent Reference 2: JP 2006-297338 A
Patent Reference 3: JP 8-155281 A
Patent Reference 4: JP 8-276122 A
Patent Reference 5: JP 59-187003 A
Patent Reference 6: JP 59-189113 A Non-Patent References Non-patent Reference 1: J. Membr. Sci., Vol. 310, p. 466 (2008).
Non-patent Reference 2: The proceedings of the Annual Meeting of the Society of Fiber Science and Technology, Japan, Vol. 56, No. 1, p. 33 (2001).

SUMMARY OF THE INVENTION

Problem to be Solved by the Invention

To solve the above problems, an objective of the present invention is to provide a multilayered charge-mosaic membrane with a large salt permeation flux and excellent mechanical strength.

Means for Solving the Problems

The above problems can be solved by providing a multilayered charge-mosaic membrane comprising a porous supporting layer (A) made of fibers having an average fiber diameter of 1 μm or more and 100 μm or less, a porous intermediate layer (B) made of fibers having an average fiber diameter of 0.01 μm or more and less than 1 μm and a charge-mosaic layer (C) comprising cationic polymer domains and anionic polymer domains, wherein the porous supporting layer (A), the porous intermediate layer (B) and the charge-mosaic layer (C) are located in this order or the charge-mosaic layer (C) is formed within the porous intermediate layer (B); the porous supporting layer (A) and/or the porous intermediate layer (B) are made of a fiber layer comprising hydrophilic fibers in at least 50% by weight; the porous intermediate layer (B) has a thickness of 0.1 to 100 μm; a porosity of the porous supporting layer (A) is larger than a porosity of the porous intermediate layer (B); and the cationic polymer and/or the anionic polymer constituting the charge-mosaic layer (C) are a polyvinyl alcohol having an ionic group.

The hydrophilic fiber is suitably a polyvinyl alcohol fiber, and the porous supporting layer (A) suitably contains a hydrophobic polymer. The hydrophobic polymer is suitably at least one selected from the group consisting of polyolefin, polyester and polyamide. Suitably, the porous supporting layer (A) is made of a fiber layer containing a hydrophobic polymer in at least 50% by weight while the porous intermediate layer (B) is made of a fiber layer containing a hydrophilic fiber in at least 50% by weight. The cationic polymer and/or the anionic polymer constituting the charge-mosaic layer (C) are suitably a block copolymer containing a polymer block having an ionic group and a vinyl alcohol polymer block.

A further suitable embodiment of the present invention is a method for manufacturing the multilayered charge-mosaic membrane comprising forming the porous intermediate layer (B) on the porous supporting layer (A) and then forming the charge-mosaic layer (C) on the porous intermediate layer (B) by printing. The method comprising conducting annealing and/or cross-linking after forming the charge-mosaic layer (C) on the porous intermediate layer (B) by printing is also a suitable embodiment of the present invention.

Effects of the Invention

A multilayered charge-mosaic membrane of the present invention has a large salt permeation flux and is excellent in mechanical strength. Thus, it allows for efficiently separating electrolytes and nonelectrolytes and removing electrolytes (desalting) and can be used in diffusion dialysis and piezodialysis. Furthermore, the porous supporting layer improves dimensional stability in a planar direction.

BEST MODE FOR CARRYING OUT THE INVENTION

Figure 1:
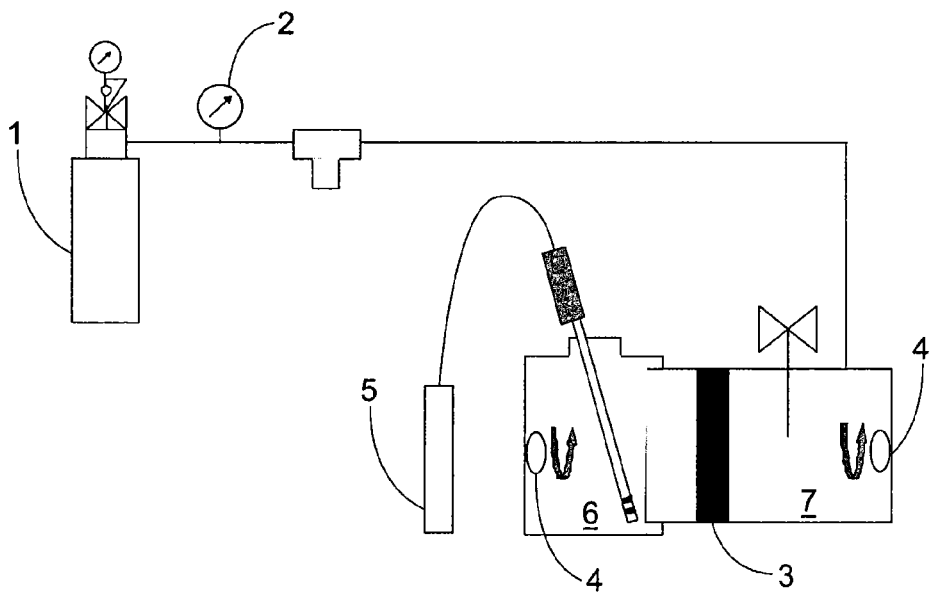
FIG. 1 shows a piezodialysis testing device.

The multilayered charge-mosaic membrane of the present invention has a porous supporting layer (A), a porous intermediate layer (B) and a charge-mosaic layer (C) comprising cationic polymer domains and anionic polymer domains, wherein the porous supporting layer (A), the porous intermediate layer (B) and the charge-mosaic layer (C) are located in this order or the charge-mosaic layer (C) is formed within the porous intermediate layer (B). A multilayered charge-mosaic membrane of the present invention is characterized in that the porous supporting layer (A) and/or the porous intermediate layer (B) are made of a fiber layer comprising hydrophilic fibers in at least 50% by weight; the cationic polymer and/or the anionic polymer constituting the charge-mosaic layer (C) are a polyvinyl alcohol having an ionic group; and a porosity of the porous supporting layer (A) is larger than a porosity of the porous intermediate layer (B). Thus, there can be provided a multilayered charge-mosaic membrane having a large salt permeation flux and exhibiting excellent mechanical strength. In other words, the present invention can improve mechanical strength of a multilayered charge-mosaic membrane itself without reducing a water processing rate where the porous supporting layer (A) and the porous intermediate layer (B) are made of a fiber layer comprising hydrophilic fibers in at least 50% by weight; the cationic polymer and the anionic polymer constituting the charge-mosaic layer (C) are a polyvinyl alcohol having an ionic group; and a porous supporting layer (A) having a larger porosity than the porous intermediate layer (B) is used. Furthermore, using the porous intermediate layer (B) having a smaller porosity than the porous supporting layer (A) and a thickness of 0.1 to 100 the porous intermediate layer (B) has a smoother surface, so that the charge-mosaic layer (C) can be uniform and robust. As a result, a salt permeation flux can be increased.

A cationic polymer used in the present invention is a polymer containing a cationic group in its molecular chain. The cationic group can be contained in any of a main chain, a side chain and a terminals. Examples of a cationic group include ammonium group, iminium group, sulfonium group and phosphonium group. Furthermore, a cationic group also includes a functional group which can be at least partly converted to ammonium group or iminium group in water, such as amino group and imino group. Among these, ammonium group is preferable in the light of industrial availability. Ammonium group can be any of primary ammonium group (ammonium group), secondary ammonium group (alkyl ammonium group or the like), tertiary ammonium group (dialkyl ammonium group or the like), and quaternary ammonium group (trialkyl ammonium group or the like), and is more preferably quaternary ammonium group (trialkyl ammonium group or the like). The cationic polymer can contain one or multiple types of cationic groups. Examples of a counter anion to the cationic group include, but not limited to, halide ion, hydroxide ion, phosphoric ion and carboxylic ion. Among these, in the light of availability, halide ion is preferable and chloride ion is more preferable. The cationic polymer can contain one or multiple types of counter anions.

A cationic polymer used in the present invention can be a polymer consisting of a structural unit containing the above cationic-group or the polymer further containing a structural unit free from the cationic group. These polymers are preferably crosslinkable. The cationic polymer can be made of one type of polymer or contain multiple types of cationic polymers. Alternatively, it can be a mixture of the cationic polymer described above and another polymer. Here, it is desirable that polymers other than the cationic polymers are not an anionic polymer.

Examples of a cationic polymer include those having a structural unit represented by any of general formulas (1) to (8).

[chem. 1]

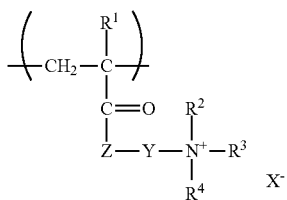

(1)

wherein $R^1$ represents hydrogen or alkyl group having 1 to 4 carbon atoms; $R^2$, $R^3$ and $R^4$, independently of each other, represent hydrogen or optionally substituted alkyl group, aryl group or aralkyl group having 1 to 18 carbon atoms; $R^2$, $R^3$ and $R^4$ can be linked together to form a saturated or unsaturated cyclic structure; Z represents —O—, —NH— or —N(CH$_3$)—; Y represents a divalent linking group having 1 to 8 carbon atoms in total and optionally containing oxygen, nitrogen, sulfur or phosphorous; and $X^-$ represents an anion.

Examples of the counter anion $X^-$ in general formula (1) include halide ion, hydroxide ion, phosphoric ion and carboxylic ion. Examples of a cationic polymer having a structural unit represented by general formula (1) include homopolymers or copolymers of a 3-(meth)acrylamido-alkyltrialkylammonium salt such as 3-(meth)acrylamido-propyltrimethylammonium chloride and 3-(meth)acrylamido-3,3-dimethylpropyltrimethylammonium chloride.

[chem. 2]

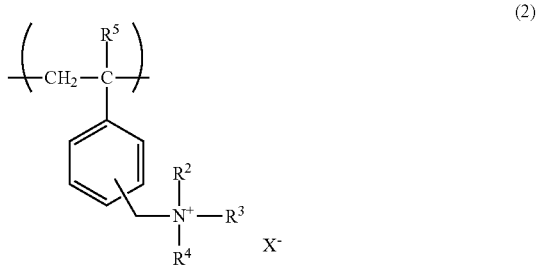

(2)

wherein $R^5$ represents hydrogen or methyl group; and $R^2$, $R^3$, $R^4$ and $X^-$ are as defined in general formula (1).

Examples of a cationic polymer having a structural unit represented by general formula (2) include homopolymers or copolymers of a vinylbenzyltrialkylammonium salt such as vinylbenzyltrimethylammonium chloride.

[chem. 3]

(3)

wherein $R^2$, $R^3$ and $X^-$ are as defined in general formula (1).

[chem. 4]

(4)

wherein $R^2$, $R^3$ and $X^-$ are as defined in general formula (1).

Examples of a cationic polymer containing a structural unit represented by general formulas (3) and (4) include homopolymers or copolymers formed by cyclization polymerization of a diallyldialkylammonium salt such as diallyldimethylammonium chloride.

[chem. 5]

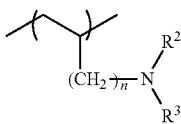
(5)

wherein n represents 0 or 1; and $R^2$ and $R^3$ are as defined in general formula (1).

Examples of a cationic polymer containing a structural unit represented by general formula (5) include homopolymers or copolymers of allylamine.

[chem. 6]

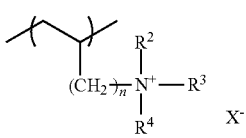
(6)

wherein n represents 0 or 1; and $R^2$, $R^3$, $R^4$ and $X^-$ are as defined in general formula (1).

Examples of a cationic polymer containing a structural unit represented by general formula (6) include homopolymers or copolymers of an allylammonium salt such as allylamine hydrochloride.

[chem. 7]

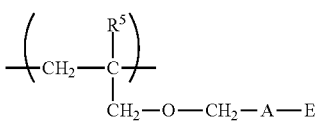
(7)

wherein $R^5$ represents hydrogen or methyl group; A represents —CH(OH)CH$_2$—, —CH$_2$CH(OH)—, —C(CH$_3$)(OH)CH$_2$—, —CH$_2$C(CH$_3$)(OH)—, —CH(OH)CH$_2$CH$_2$— or —CH$_2$CH$_2$CH(OH)—; E represents —N(R$^6$)$_2$ or —N$^+$(R$^6$)$_3$.X$^-$; and $R^6$ represents hydrogen or methyl group; and $X^-$ represents an anion.

Examples of a cationic polymer containing a structural unit represented by general formula (7) include homopolymers or copolymers of N-(3-allyloxy-2-hydroxypropyl)dimethylamine or its quaternary ammonium salt, or homopolymers or copolymers of N-(4-allyloxy-3-hydroxybutyl)diethylamine or its quaternary ammonium salt.

[chem. 8]

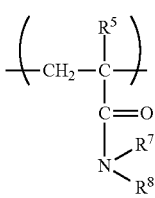
(8)

wherein $R^5$ represents hydrogen or methyl group; $R^7$ represents hydrogen, methyl group, ethyl group, n-propyl group or i-propyl group; and $R^8$ represents hydrogen, methyl group and ethyl group.

Examples of a cationic polymer containing a structural unit represented by general formula (8) include (meth)acrylamide, N-methyl(meth)acrylamide, N-ethyl(meth)acrylamide and N,N-dimethyl(meth)acrylamide.

An anionic polymer used in the present invention is a polymer containing an anionic group in its molecular chain. The anionic group can be contained in any of a main chain, a side chain and a terminal. Examples of an anionic group include sulfonate group, carboxylate group and phosphonate group. Furthermore, the anionic group also includes a functional group which can be at least partly converted to sulfonate group, carboxylate group or phosphonate group in water, such as sulfonic group, carboxyl group and phosphonic acid group. Among these, in the light of a large ion dissociation constant, sulfonate group is preferable. The anionic polymer can contain one anionic group or multiple types of anionic groups. Examples of a counter cation to the anionic group include, but not limited to, proton and alkali metal ions. Among these, an alkali metal ion is preferable in the light of minimization of the problem of corrosion in a facility. The anionic polymer can contain one type of counter cation or multiple types of counter cations.

An anionic polymer used in the present invention can be a polymer consisting of a structural unit containing the above anionic-group or the polymer further containing a structural unit free from the anionic group. These polymers are preferably crosslinkable. The anionic polymer can be made of one type of polymer or contain multiple types of anionic polymers. Alternatively, it can be a mixture of the anionic polymer described above and another polymer. Here, it is desirable that polymers other than the anionic polymers are not a cathionic polymer.

Examples of an anionic polymer include those having a structural unit represented by any of general formulas (9) and (10).

[chem. 9]

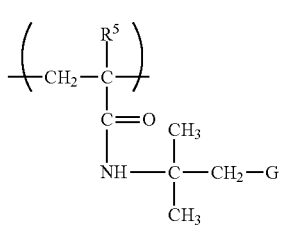
(9)

wherein $R^5$ represents hydrogen or methyl group; G represents —SO$_3$H, —SO$_3$$^-$M$^+$, —PO$_3$H, —PO$_3$$^-$M$^+$, —CO$_2$H or —CO$_2$$^-$M$^+$; M$^+$ is ammonium ion or alkali metal ion.

Examples of an anionic polymer containing a structural unit represented by general formula (9) include homopolymers or copolymers of 2-acrylamido-2-methylpropanesulfonic acid.

[chem. 10]

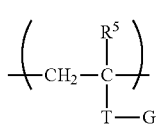
(10)

wherein $R^5$ represents hydrogen or methyl group; T represents phenylene group or naphthylene group in which hydrogen is optionally replaced by methyl group; and G is as defined for general formula (9).

Examples of an anionic polymer containing a structural unit represented by general formula (10) include homopolymers or copolymers of a p-styrenesulfonate such as sodium p-styrenesulfonate.

Furthermore, examples of an anionic polymer can include homopolymers or copolymers of a sulfonic acid such as vinylsulfonic acid and (meth)allylsulfonic acid or its salt, or homopolymers or copolymers of a dicarboxylic acid such as fumaric acid, maleic acid, itaconic acid, maleic anhydride and itaconic anhydride or its derivative or salt.

In general formula (9) or (10), G is preferably sulfonate group, sulfonic group, phosphonate group or phosphonic group, which gives a higher charge density. An alkali metal ion represented by $M^+$ in general formulas (9) and (10) include sodium, potassium and lithium ions.

When an ionic polymer selected from cationic and anionic polymers is a copolymer, a copolymerizable component can be suitably a vinyl alcohol component. When a mixture of a polymer containing an ionic group selected from cationic and anionic groups and a polymer free from an ionic group selected from cationic and anionic groups is used, the polymer free from an ionic group suitably has high affinity for the polymer containing an ionic group. Specific examples suitably include one selected from the group consisting of polyvinyl alcohol and polyacrylamide. Among these, polyvinyl alcohol is more suitably used because of its higher cross-linking ability.

In a multilayered charge-mosaic membrane of the present invention, a cationic or anionic polymer is preferably a hydrophilic polymer, which advantageously reduces a pressure loss. The cationic or the anionic polymer as a hydrophilic polymer means that the structure without a functional group required for making the polymer cationic or anionic is hydrophilic. In particular, when the hydrophilic polymer is a water-soluble polymer, water-based printing can be used to form the charge-mosaic layer (C). Thus, the cationic and the anionic polymer as a hydrophilic polymer allows for providing a multilayered charge-mosaic membrane with high hydrophilicity and for reducing the problem of deterioration in membrane performance due to adhesion of an organic foulant in a liquid to be treated to the multilayered charge-mosaic membrane. Furthermore, membrane strength is improved.

Examples of a hydrophilic cationic polymer include polyvinyl alcohols containing a cationic group, cellulose derivatives containing a cationic group, polyacrylamides containing a cationic group, a mixture of a polymer containing a cationic group and a cationic-group-free polyvinyl alcohol, a mixture of a polymer containing a cationic group and a cationic-group-free cellulose derivative, and a mixture of a polymer containing a cationic group and a cationic-group-free polyacrylamide. Among these, preferred are polyvinyl alcohols containing a cationic group and a mixture of a polymer containing a cationic group and a cationic-group-free polyvinyl alcohol. It is preferable to use a polymer containing a polyvinyl alcohol unit in the light of strength of a multilayered charge-mosaic membrane, flexibility of a charge-mosaic layer (C) and physical or chemical crosslinkability. Among these, particularly preferred are a copolymer of a methacrylamide alkyltrialkylammonium salt with a polyvinyl alcohol component, a copolymer of a vinylbenzyltrialkylammonium salt with a polyvinyl alcohol component, a copolymer of a diallyldialkylammonium salt with a polyvinyl alcohol component, a mixture of a polymer of a methacrylamide alkyltrialkylammonium salt and a polyvinyl alcohol, a mixture of a polymer of a vinylbenzyltrialkylammonium salt and a polyvinyl alcohol, and a mixture of a polymer of a diallyldialkylammonium salt and a polyvinyl alcohol in the light of availability. In a polyvinyl alcohol containing a cationic group or a mixture of a polymer containing a cationic group and a cationic-group-free polyvinyl alcohol, a proportion of the number of a vinyl alcohol unit to the total number of monomer units in the cationic polymer is preferably 50 mol % or more, more preferably 70 mol % or more. When the cationic polymer is a hydrophilic polymer, it can be one hydrophilic polymer or a mixture of multiple hydrophilic polymers. Alternatively, it can be a mixture of a hydrophilic polymer and a non-hydrophilic polymer. It can contain a polymer other than the hydrophilic or non-hydrophilic cationic polymer. Here, desirably, the polymer other than the cationic polymer is not an anionic polymer.

Examples of a hydrophilic anionic polymer include polyvinyl alcohols containing an anionic group, cellulose derivatives containing an anionic group, polyacrylamides containing an anionic group, a mixture of a polymer containing an anionic group and an anionic-group-free polyvinyl alcohol, a mixture of a polymer containing an anionic group and an anionic-group-free cellulose derivative, and a mixture of a polymer containing an anionic group and an anionic-group-free polyacrylamide. Among these, preferred are polyvinyl alcohols containing an anionic group and a mixture of a polymer containing an anionic group and an anionic-group-free polyvinyl alcohol. It is preferable to use a polymer having a polyvinyl alcohol unit in the light of strength of a multilayered charge-mosaic membrane, flexibility of a charge-mosaic layer (C) and physical or chemical cross-linking. Among these, particularly preferred are a copolymer of 2-acrylamide-2-methylpropanesulfonic acid salt component with a vinyl alcohol component, a copolymer of a p-styrenesulfonic acid salt component with a vinyl alcohol component, a mixture of a polymer of a 2-acrylamide-2-methylpropanesulfonic acid salt and a polyvinyl alcohol and a mixture of a polymer of a polystyrenesulfonic acid salt and a polyvinyl alcohol in the light of availability. In a polyvinyl alcohol containing an anionic group or a mixture of a polymer containing an anionic group and an anionic-group-free polyvinyl alcohol, a proportion of the number of a vinyl alcohol unit to the total number of monomer units in the anionic polymer is preferably 50 mol % or more, more preferably 70 mol % or more. When the anionic polymer is a hydrophilic polymer, it can be one hydrophilic polymer or a mixture of multiple hydrophilic polymers. Alternatively, it can be a mixture of a hydrophilic polymer and a non-hydrophilic polymer. Furthermore, it can contain a polymer other than a hydrophilic or non-hydrophilic cationic polymer. Here, desirably, the polymer other than the anionic polymer is not a cationic polymer.

In the present invention, the cationic polymer and/or the anionic polymer constituting the charge-mosaic layer (C) is a polyvinyl alcohol having an ionic group. In particular, the cationic polymer and/or the anionic polymer is suitably a block copolymer or graft copolymer containing a polymer component prepared by polymerizing an ionic monomer and a polyvinyl alcohol component; more suitably a block copolymer. Thus, the ionic polymer is subjected to microphase separation, allowing for sharing roles of a polyvinyl alcohol component responsible for improving strength of the whole multilayered charge-mosaic membrane, controlling a membrane swelling degree and shape holding and a polymer component prepared by polymerizing an ionic monomer responsible for permeation of positive or negative ions, and making a swelling degree and dimensional stability of the multilayered charge-mosaic membrane well balanced. Examples of the structural unit of the polymer component prepared by polymerizing an ionic monomer can include, but not limited to, those represented by general formulas (1) to (10). Among these, the cationic polymer is preferably selected from a block copolymer containing a polymer component prepared by polymerizing a methacrylamide alkyltrialkylammonium salt and a polyvinyl alcohol component, a block copolymer containing a polymer component prepared by polymerizing a vinylbenzyltrialkyl salt and a polyvinyl alcohol component and a block copolymer containing a polymer component prepared by polymerizing a diallyldialkylammonium salt and a polyvinyl alcohol component in the light of availability. the anionic polymer is preferably selected from a block copolymer containing a polymer component prepared by polymerizing a p-styrenesulfonic acid salt and a polyvinyl alcohol component and a block copolymer containing a polymer component prepared by polymerizing a 2-acrylamide-2-methylpropanesulfonic acid salt and a polyvinyl alcohol component.

Processes for producing a block copolymer containing a polymer component prepared by polymerizing an ionic monomer and a polyvinyl alcohol component used in the present invention can be generally classified into the following two categories; (1) a process comprising preparing a desired block copolymer and then attaching an ionic group to a particular block, and (2) a process comprising polymerizing at least one ionic monomer to prepare a desired block copolymer. In view of industrial convenience, preferably the process (1) comprises block-copolymerizing one or more monomers in the presence of a polyvinyl alcohol having a mercapto group at polymer end and then introducing an ionic group to one or more polymer components in the block copolymer, while the process (2) comprises radical-polymerizing at least one ionic monomer in the presence of a polyvinyl alcohol having a mercapto group at polymer end to prepare a block copolymer. In particular, preferred is a process for producing a block copolymer by radical-polymerizing at least one ionic monomer in the presence of a polyvinyl alcohol having a mercapto group at polymer end because the types and the amounts of the polymer components prepared by polymerizing a polyvinyl alcohol component and an ionic monomer in the block copolymer can be easily controlled. The block copolymer containing a polymer component prepared by polymerizing an ionic monomer and a polyvinyl alcohol component thus produced may contain the unreacted polyvinyl alcohol having a mercapto group at polymer end.

A vinyl alcohol polymer containing a mercapto group at polymer end used in the production of a block copolymer described above can be prepared, for example, as described in Patent Reference 5. That is, it can be, for example, prepared by saponifying a vinyl ester polymer formed by radically polymerizing a vinyl ester monomer such as vinyl acetate in the presence of a thiol acid. A process for producing a block copolymer using a polyvinyl alcohol containing a mercapto group at polymer end thus obtained and an ionic monomer is described, for example, in Patent Reference No. 6. That is, a block copolymer can be produced by radical polymerization of an ionic monomer in the presence of a polyvinyl alcohol containing a mercapto group at polymer end. This radical polymerization can be conducted by any known method such as bulk polymerization, solution polymerization, pearl polymerization and emulsion polymerization, and preferably conducted in a solvent which can dissolve the polyvinyl alcohol containing a mercapto group at polymer end, such as a water or dimethyl sulfoxide based medium. The polymerization process can be any of batch, semi-batch and continuous types.

There are no particular restrictions to a content of an ionic monomer in an ionic polymer, but a content of an ionic monomer in an ionic polymer, that is, a proportion of the number of an ionic monomer unit to the total number of monomer units in an ionic polymer is preferably 0.1 mol % or more. If a content of an ionic monomer is less than 0.1 mol %, an effective charge density in the charge-mosaic layer (C) may be reduced, leading to deterioration in electrolyte permselectivity. The content is more preferably 0.5 mol % or more, further preferably 1 mol % or more. The content of an ionic monomer is preferably 50 mol % or less. If the content of an ionic monomer is more than 50 mol %, a multilayered charge-mosaic membrane becomes so swellable that an electrolyte permeation flux may be reduced. The content of an ionic monomer is more preferably 30 mol % or less, further preferably 20 mol % or less. When an ionic polymer is a mixture of a polymer containing an ionic group and an ionic-group-free polymer or a mixture of multiple types of polymers containing an ionic group, a content of an ionic monomer unit is a proportion of the number of the ionic monomer unit to the total number of monomer units in the mixture.

In an ionic polymer selected from cationic and anionic polymers, structural units except an ionic group can be independently of each other selected, but it is preferable that the cationic polymer and the anionic polymer have an identical structural unit. Thus, affinity between domains is improved, so that a charge-mosaic layer (C) has higher mechanical strength. Both cationic and anionic polymers have an identical structural unit preferably in 50 mol % or more, more preferably 80 mol % or more.

Since the identical structural unit is a polyvinyl alcohol unit in the present invention, domains can be chemically crosslinked via a crosslinking agent such as glutaraldehyde, so that mechanical strength of a multilayered charge-mosaic membrane can be further improved.

In a specific example in which the identical structural unit is a vinyl alcohol unit, cationic polymer domains are made of a polyvinyl alcohol containing a cationic-group or a mixture of a polymer containing a cationic-group and a cationic-group-free polyvinyl alcohol and anionic polymer domains are made of a polyvinyl alcohol containing an anionic-group or a mixture of a polymer containing an anionic-group and a cationic-group-free polyvinyl alcohol.

The cationic polymer and/or the anionic polymer constituting the charge-mosaic layer (C) is preferably a block copolymer containing a polymer block having an ionic group and a vinyl alcohol polymer block. It allows for crosslinking, so that adhesiveness between the porous intermediate layer (B) and the charge-mosaic layer (C) is advantageously improved.

A polyvinyl alcohol containing an ionic group selected from cationic and anionic groups is produced by copolymerizing an ionic monomer with a vinyl ester monomer and saponifying the resulting copolymer as usual. The vinyl ester monomer can be any radically polymerizable monomer. Examples include vinyl formate, vinyl acetate, vinyl propionate, vinyl valerate, vinyl caprate, vinyl laurate, vinyl stearate, vinyl benzoate, vinyl pivalate and vinyl versatate. Among these, vinyl acetate is preferable.

An ionic monomer can be copolymerized with a vinyl ester monomer by a known method such as bulk polymerization, solution polymerization, suspension polymerization and emulsion polymerization. Among these, bulk polymerization in a nonsolvent system and solution polymerization using a solvent such as an alcohol are generally employed. An alcohol used as a solvent in a copolymerization reaction employing solution polymerization can be a lower alcohol such as methyl alcohol, ethyl alcohol and propyl alcohol. Examples of an initiator used in the copolymerization reaction include known initiators including an azo initiator such as 2,2'-azobisisobutyronitrile (AIBN), 2,2'-azobis(2,4-dimethyl-valeronitrile), 1,1'-azobis(cyclohexane-1-carbonitrile) and 2,2'-azobis(N-butyl-2-methylpropionamide); and a peroxide initiator such as benzoyl peroxide and n-propyl peroxycarbonate. A polymerization temperature during the copolymerization reaction is suitably, but not limited to, 5 to 180° C.

A vinyl ester polymer prepared by copolymerizing an ionic monomer with a vinyl ester monomer is saponified in a solvent by a known method to give polyvinyl alcohol containing an ionic group.

A catalyst for a saponification reaction of a vinyl ester polymer is generally an alkaline substance such as alkali metal hydroxides such as potassium hydroxide and sodium hydroxide; and alkali metal alkoxides such as sodium methoxide. The saponification catalyst can be added in one portion at the initiation of the saponification reaction or it can be added in part at the initiation of the saponification reaction and the remaining is added in the course of the saponification reaction. Examples of a solvent used in the saponification reaction include methanol, methyl acetate, dimethyl sulfoxide, diethyl sulfoxide and dimethylformamide. Among these solvents, methanol is preferable. The saponification reaction can be conducted either in batch style or in a continuous process. At the end of the saponification reaction, the remaining saponification catalyst can be, if necessary, neutralized and examples of a neutralizing agent include organic acids such as acetic acid and lactic acid and ester compounds such as methyl acetate.

A saponification degree of a polyvinyl alcohol containing an ionic group is preferably, but not limited to, 40 to 99.9 mol %. If a saponification degree is less than 40 mol %, crystallinity may be deteriorated and the charge-mosaic layer (C) has inadequate strength. A saponification degree is more preferably 60 mol % or more, further preferably 80 mol % or more. A saponification degree is generally 99.9 mol % or less. Here, when the polyvinyl alcohol is a mixture of multiple types of polyvinyl alcohols, a saponification degree is an average saponification degree of the whole mixture. A saponification degree of a polyvinyl alcohol is determined in accordance with JIS K6726. A saponification degree of an ionic-group-free polyvinyl alcohol used in the present invention is also preferably within the above range.

A viscosity-average polymerization degree of a polyvinyl alcohol containing an ionic group (hereinafter, sometimes simply referred to as "polymerization degree") is preferably, but not limited to, 50 to 10000. If a polymerization degree is less than 50, the charge-mosaic layer (C) may have inadequate strength in practical use. A polymerization degree is more preferably 100 or more. If a polymerization degree is more than 10000, a viscosity of a polymerization solution used in printing may become too high to be handled. A polymerization degree is preferably 8000 or less. Here, when the polyvinyl alcohol is a mixture of multiple types of polyvinyl alcohols, a polymerization degree is an average polymerization degree of the whole mixture. A viscosity-average polymerization degree of a polyvinyl alcohol is determined in accordance with JIS K6726. A polymerization degree of an ionic-group-free polyvinyl alcohol used in the present invention is also preferably within the above range.

There are no particular restrictions to the porous supporting layer (A) used in the present invention as long as it is porous. The use of the porous supporting layer (A) results in improved mechanical strength of a multilayered charge-mosaic membrane obtained and promotion of salt transport.

Examples of the porous supporting layer (A) include nonwoven fabrics, membranes, textile fabrics and synthetic papers, and any known porous sheet can be used. Among these, further preferred are nonwoven fabrics, membranes and synthetic papers. A material for the porous supporting layer (A) is particularly preferably a polyvinyl alcohol fiber assembly, advantageously giving higher strength.

A thickness of the porous supporting layer (A) used in the present invention is preferably, but not limited to, 5 to 1000 µm. If a thickness of the porous supporting layer (A) is less than 5 µm, a multilayered charge-mosaic membrane may have inadequate strength. The thickness is more preferably 10 µm or more, further preferably 30 µm or more. If a thickness of the porous supporting layer (A) is more than 1000 µm, salts may be poorly transported. The thickness is more preferably 800 µm or less, further preferably 300 µm or less.

A basis weight of the porous supporting layer (A) used in the present invention is preferably, but not limited to, 1 to 100 g/m$^2$. If the basis weight is less than 1 g/m$^2$, a multilayered charge-mosaic membrane obtained has reduced mechanical strength, and thus it is more preferably 5 g/m$^2$ or more, further preferably 10 g/m$^2$ or more. If the basis weight is more than 100 g/m$^2$, transport resistance of salt in the multilayered charge-mosaic membrane may be increased, leading to insufficient transport, and thus it is more preferably 80 g/m$^2$ or less, further preferably 50 g/m$^2$ or less.

There are no particular restrictions to a porosity of the porous supporting layer (A) used in the present invention as long as it is larger than a porosity of the porous intermediate layer (B) described later. Thus, using the porous supporting layer (A) with a porosity larger than a porosity of the porous intermediate layer (B), mechanical strength can be improved and a salt permeation flux can be increased, and furthermore, electrolyte permselectivity can be improved. A difference in porosity is preferably 5% or more, more preferably 10% or more, further preferably 15% or more.

Porosities of the porous supporting layer (A) and the porous intermediate layer (B) can be controlled within a desired range by a known means. A porosity can be controlled by adjusting a basis weight of a resin in production and a layer thickness. When voids are formed by foaming of a resin, a porosity can be controlled by adjusting an expansion ratio depending on the type and the amount of a foaming agent. When the porous supporting layer (A) and/or the porous intermediate layer (B) are made of a fiber layer, a porosity can be controlled by adjusting an interlacing density of the fiber. Furthermore, by reducing a fiber diameter, an interlacing density can be easily increased and a porosity can be increased.

A porosity of the porous supporting layer (A) is preferably 40 to 90%. A porosity within this range allows for improving mechanical strength of a multilayered charge-mosaic membrane obtained and keeping air permeability within a certain range. If a porosity of the porous supporting layer (A) is less than 40%, resistance to salt transport may be increased, and thus it is more preferably 50% or more, further preferably 55% or more. If a porosity of the porous supporting layer (A) is more than 90%, mechanical strength of a multilayered charge-mosaic membrane obtained may be deteriorated, and thus it is more preferably 80% or less, further preferably 75% or less.

In the present invention, the porous supporting layer (A) is made of fibers having an average fiber diameter of 1 µm or more and 100 µm or less. Thus, a multilayered charge-mosaic membrane exhibiting excellent mechanical strength can be provided. If an average fiber diameter is less than 1 µm, resistance to salt transport may be increased and thus it is preferably 3 µm or more. If an average fiber diameter is more than 100 µm, surface smoothness may be too reduced to uniformly form the porous intermediate layer (B), and thus it is preferably 50 µm or less.

There are no particular restrictions to the porous intermediate layer (B) used in the present invention as long as it is porous and has a thickness of 0.1 to 100 µm. The porous intermediate layer (B) is made of, for example, polyvinyl alcohol or polyacrylamide. Among these, polyvinyl alcohol is suitably used. Using such a porous intermediate layer (B), surface smoothness of the porous intermediate layer (B) is improved and the charge-mosaic layer (C) can be uniformly formed on the porous intermediate layer (B). Consequently, it is advantageous because of a large salt permeation flux in a multilayered charge-mosaic membrane obtained and excellent electrolyte permselectivity. If a thickness of the porous intermediate layer (B) is less than 0.1 µm, pinholes may be formed, and thus it is preferably 0.5 µm or more, more preferably 1 µm or more. If a thickness of the porous intermediate layer (B) is more than 100 µm, resistance to salt transport may be increased, and thus it is preferably 70 µm or less, more preferably 50 µm or less. A ratio (A/B) of a thickness of the porous supporting layer (A) to a thickness of the porous intermediate layer (B) is, but not limited to, preferably 2 or more, more preferably 5 or more, further preferably 10 or more. The thickness ratio (A/B) is generally 100 or less.

A basis weight of the porous intermediate layer (B) used in the present invention is preferably, but not limited to, 0.1 to 10 $g/m^2$. If the basis weight is less than 0.1 $g/m^2$, pinholes may be formed, and thus it is more preferably 0.8 $g/m^2$ or more, further preferably 1 $g/m^2$ or more. If the basis weight is more than 10 $g/m^2$, resistance to salt transport may be increased, and thus it is more preferably 5 $g/m^2$ or less. A ratio (A/B) of a basis weight of the porous supporting layer (A) to a basis weight of the porous intermediate layer (B) is, but not limited to, preferably 2 or more, more preferably 5 or more. The basis weight ratio (A/B) is generally 100 or less.

There are no particular restrictions to a porosity of the porous intermediate layer (B) used in the present invention as long as it is smaller than a porosity of the porous supporting layer (A), and specifically, it is preferably 30 to 80%. A porosity within this range allows for improving surface smoothness of the porous intermediate layer (B), so that the charge-mosaic layer (C) is uniformly formed on the porous intermediate layer (B). Consequently, a salt permeation flux in the multilayered charge-mosaic membrane obtained is advantageously increased. If a porosity of the porous intermediate layer (B) is less than 30%, resistance to salt transport may be increased, and thus it is preferably 35% or more. If a porosity of the porous intermediate layer (B) is more than 80%, the charge-mosaic layer (C) may not be uniformly formed, and thus it is more preferably 70% or less, further preferably 65% or less.

In the present invention, the porous intermediate layer (B) is made of a fiber layer having an average fiber diameter of 0.01 µm or more and less than 1 µm. Thus, surface smoothness of the porous intermediate layer (B) can be higher and the charge-mosaic layer (C) can be uniformly formed on the porous intermediate layer (B), and the porous intermediate layer (B) has a higher density. Consequently, a salt permeation flux in a multilayered charge-mosaic membrane obtained is advantageously increased. If the average fiber diameter is less than 0.01 µm, the fiber layer may exhibit insufficient strength, and thus it is preferably 0.05 µm or more, more preferably 0.1 µm or more. If the average fiber diameter is 1 µm or more, surface smoothness of the fiber layer may be deteriorated, and thus it is preferably 0.8 µm or less, more preferably 0.6 µm or less. A (A/B) ratio of an average fiber diameter of the porous supporting layer (A) to an average fiber diameter of the porous intermediate layer (B) is, but not limited to, preferably 2 or more, more preferably 5 or more. The average fiber diameter ratio (A/B) is generally 100 or less.

In the present invention, the porous supporting layer (A) and/or the porous intermediate layer (B) are made of a fiber layer containing hydrophilic fibers in at least 50% by weight. The porous intermediate layer (B) made of a fiber layer containing hydrophilic fibers in at least 50% by weight is advantageous in that a pressure loss is reduced and a water processing rate is increased. Furthermore, since affinity for the charge-mosaic layer (C) is improved, adhesiveness between the porous intermediate layer (B) and the charge-mosaic layer (C) is advantageously improved. In particular, the porous supporting layer (A) and the porous intermediate layer (B) are made of a fiber layer containing hydrophilic fibers in at least 50% by weight, so that, in addition to the above effect, interlayer adhesiveness between the porous supporting layer (A) and the porous intermediate layer (B) is advantageously improved.

In the present invention, the hydrophilic fiber is preferably a polyvinyl alcohol fiber. In other words, the porous supporting layer (A) and/or the porous intermediate layer (B) is preferably made of a fiber layer containing polyvinyl alcohol fibers in at least 50% by weight. Thus, advantageously, a pressure loss is reduced and a water processing rate is increased. Furthermore, since affinity for the charge-mosaic layer (C) is improved, adhesiveness between the porous intermediate layer (B) and the charge-mosaic layer (C) is advantageously improved.

In the present invention, the porous supporting layer (A) preferably contains a hydrophobic polymer. Thus, it can provide a multilayered charge-mosaic membrane with excellent strength in water, a large salt permeation flux and excellent electrolyte permselectivity. It is preferable that the porous supporting layer (A) contains a hydrophobic polymer because it inhibits swelling or deformation of the porous supporting layer (A) due to water absorption to improve dimensional stability. In particular, when the porous intermediate layer (B) is formed on the porous supporting layer (A) and a solution or dispersion is applied or printed on the porous intermediate layer (B) to form the charge-mosaic layer (C), swelling or deformation of the porous supporting layer (A) can be inhibited, resulting in improvement in dimensional stability. As a result, the charge-mosaic layer (C) resistant to defect formation can be formed. Furthermore, void formation in an interface of the charge-mosaic layer (C) can be prevented. The inventors have found that when the porous supporting layer (A) is made of a hydrophilic fiber, dimensional variation in the porous supporting layer (A) influences a multilayered charge-mosaic membrane to increase its air permeability. They have particularly observed that as a size (Wc) of the cationic polymer domain and a size (Wa) of the anionic polymer domain, respectively, constituting the charge-mosaic layer (C) are reduced, shrinkage of the porous supporting layer (A) becomes more influential.

There are no particular restrictions to the hydrophobic polymer used for the porous supporting layer (A) as long as it is substantially free from a protonic functional group such as a hydroxy and a carboxyl groups, and it is preferably at least one selected from the group consisting of polyolefins, polyesters and polyamides, more preferably at least one selected from the group consisting of polyesters and polyamides. The porous supporting layer (A) contains the hydrophobic polymer preferably in 50% by weight or more, more preferably in 70% by weight or more, further preferably in 90% by weight or more. There are no particular restrictions to components other than the hydrophobic polymer contained in the porous supporting layer (A), and it can be a polymer exhibiting high adhesiveness to the porous intermediate layer (B). For example, when the polymer constituting the porous intermediate layer (B) is a vinyl alcohol resin, a vinyl alcohol resin can be contained in the porous supporting layer (A) or coated on the fiber to improve adhesiveness between the porous supporting layer (A) and the porous intermediate layer (B).

A thickness of the charge-mosaic layer (C) used in the present invention is preferably, but not limited to, 0.1 to 80 in the light of increase in a salt permeation flux. If a thickness of the charge-mosaic layer (C) is less than 0.1 μm, membrane defects (pinholes) may generate during forming charge-mosaic layer (C), and mechanical strength of the charge-mosaic layer (C) may be deteriorated. The thickness is more preferably 0.5 μm or more, further preferably 1 μm or more, particularly preferably 2 μm or more. If a thickness of the charge-mosaic layer (C) is more than 80 μm, a salt permeation flux may be reduced. The thickness is more preferably 50 μm or less, further preferably 30 μm or less, particularly preferably 10 μm or less.

In a multilayered charge-mosaic membrane of the present invention, a ratio (C/D) of a thickness of a multilayer structure (D) prepared by forming the porous intermediate layer (B) on the porous supporting layer (A) to a thickness of the charge-mosaic layer (C) is preferably, but not limited to, 0.001 to 0.2. If the ratio (C/D) is less than 0.001, the charge-mosaic layer (C) obtained may have defects. The ratio is more preferably 0.005 or more, further preferably 0.01 or more. If the ratio (C/D) is more than 0.2, a salt permeation flux may become too small. The ratio is more preferably 0.15 or less, further preferably 0.1 or less.

In a multilayered charge-mosaic membrane of the present invention, a size (Wc) of a cationic polymer domain constituting the charge-mosaic layer (C) is preferably, but not limited to, 1000 μm or less because there is a tendency that the smaller a distance between a positive charge region and a negative charge region in the multilayered charge-mosaic membrane is, the higher electrolyte permselectivity is. The domain size is more preferably 500 μm or less, further preferably 300 μm or less, particularly preferably 100 μm or less. The domain size is generally 0.1 μm or more. A domain size of cationic polymer domains means an average diameter of inscribed circles to the domains, and is determined as an arithmetic average from domain dimensions microscopically observed in a horizontal direction.

A domain size (Wa) of domains in an anionic polymer constituting the charge-mosaic layer (C) in a multilayered charge-mosaic membrane of the present invention is preferably, but not limited to, 1000 μm or less because a distance between a positive charge region and a negative charge region in the multilayered charge-mosaic membrane is reduced and electrolyte permselectivity becomes higher. The domain size is more preferably 500 μm or less, further preferably 300 μm or less, particularly preferably 100 μm or less. The domain size is generally 0.1 μm or more. A domain size of anionic polymer domains means an average diameter of inscribed circles to the domains, and is determined as an arithmetic average from domain dimensions microscopically observed in a horizontal direction.

A multilayered charge-mosaic membrane of the present invention has a structure in which the porous supporting layer (A), the porous intermediate layer (B) and the charge-mosaic layer (C) described above are located in this order or the charge-mosaic layer (C) is formed within the porous intermediate layer (B). The multilayered charge-mosaic membrane of the present invention is characterized in that the porous supporting layer (A) and/or the porous intermediate layer (B) are made of a fiber layer comprising hydrophilic fibers in at least 50% by weight; the cationic polymer and/or the anionic polymer constituting the charge-mosaic layer (C) are a polyvinyl alcohol having an ionic group; and a porosity of the porous supporting layer (A) is larger than a porosity of the porous intermediate layer (B). Thus, there can be provided a multilayered charge-mosaic membrane having a large salt permeation flux and exhibiting excellent mechanical strength. There are no restrictions to a method for locating the porous supporting layer (A), the porous intermediate layer (B) and the charge-mosaic layer (C) in this order. A suitable method comprises providing a multilayer structure (D) in which the porous intermediate layer (B) is formed on the porous supporting layer (A) and forming the charge-mosaic layer (C) on the porous intermediate layer (B) in the multilayer structure (D).

In the present invention, it is preferable to form the porous intermediate layer (B) on the porous supporting layer (A) and then the product is hot-pressed. The hot-pressing can improve surface smoothness of the porous intermediate layer (B) in the multilayer structure (D), so that the charge-mosaic layer (C) can be uniformly formed on the porous intermediate layer (B). As a result, the multilayered charge-mosaic membrane obtained advantageously has a large salt permeation flux and excellent electrolyte permselectivity. Herein, a smoothness is, but not limited to, preferably 10 sec or more, more preferably 50 sec or more, further preferably 200 sec or more as a smoothness value measured in accordance with the Oken smoothness test employing the JAPAN TAPPI paper and pulp test method No. 5.

There are no particular restrictions to a process for forming the charge-mosaic layer (C) on the porous intermediate layer (B), but in view of conveniently forming the charge-mosaic layer (C) with a desired pattern, a process in which the charge-mosaic layer (C) is formed on the porous intermediate layer (B) by printing is suitably employed. A thin charge-mosaic layer (C) can be formed by the printing method and thus a multilayered charge-mosaic membrane with a large permeation flux can be produced. Furthermore, a size of each of domains made of a cationic and an anionic polymer can be reduced to provide a multilayered charge-mosaic membrane exhibiting excellent electrolyte permselectivity. The above pattern can have a shape such as, but not limited to, stripe, check, lattice and polka dot patterns. Printing is generally conducted using a printer.

A printing procedure used in the present invention can be any of known printing procedures. Specific examples of a printing procedure include ink-jet printing, screen printing, transfer printing, dispenser printing, gravure printing and offset printing. Among these, ink-jet printing, screen printing, transfer printing and dispenser printing are particularly preferable in the light of easiness in printing.

In a multilayered charge-mosaic membrane of the present invention, the charge-mosaic layer (C) can be formed exclusively on the surface of the porous intermediate layer (B) or not only on the surface of the porous intermediate layer (B) but also within the porous intermediate layer (B). The inventors have found that when the charge-mosaic layer (C) is formed on the porous intermediate layer (B) by printing, the charge-mosaic layer (C) partly enters the inside of the porous intermediate layer (B) by capillary phenomenon so that the charge-mosaic layer (C) is formed not only on the surface of the porous intermediate layer (B) but also within the porous intermediate layer (B).

In the present invention, when the charge-mosaic layer (C) is printed on the porous intermediate layer (B) and the whole charge-mosaic layer (C) enters the inside of the porous intermediate layer (B) by capillary phenomenon, the charge-mosaic layer (C) is formed within the porous intermediate layer (B), not on the porous intermediate layer (B). Here, the multilayered charge-mosaic membrane of the present invention has a structure in which the charge-mosaic layer (C) is formed within the porous intermediate layer (B). In the multilayered charge-mosaic membrane thus obtained, the charge-mosaic layer (C) is not exposed in the surface of the porous intermediate layer (B).

It is desirable that in a method for manufacturing a multilayered charge-mosaic membrane of the present invention, the charge-mosaic layer (C) formed is annealed. Annealing causes crystallinity degree to be higher, so that physical crosslinking sites increase and thus mechanical strength of the multilayered charge-mosaic membrane obtained increases. Furthermore, cationic and anionic groups are concentrated in amorphous regions to form high-density ion-exchange paths, resulting in increase in a charge density and thus improvement in counter-ion selectivity and in salt permeation flux. Annealing is generally, but not limited to, conducted using a hot-air dryer. An annealing temperature is preferably, but not limited to, 50 to 250° C. for polyvinyl alcohol. If an annealing temperature is lower than 50° C., a multilayered charge-mosaic membrane obtained may have insufficient mechanical strength. The temperature is more preferably 80° C. or higher, further preferably 100° C. or higher. If a annealing temperature is higher than 250° C., polyvinyl alcohol may be thermally decomposed. The temperature is more preferably 230° C. or lower, further preferably 200° C. or lower. An annealing period is generally about 1 min to 10 hours. Annealing is desirably conducted under an inert gas (for example, nitrogen gas and argon gas) atmosphere.

In a method for manufacturing a multilayered charge-mosaic membrane of the present invention, it is preferable that after forming the charge-mosaic layer (C), a product is hot-pressed. Hot-pressing makes the charge-mosaic layer (C) formed by printing denser, resulting in higher mechanical strength of the charge-mosaic layer (C) obtained. Hot-pressing can be generally, but not limited to, conducted using a calendering equipment. A temperature of hot-pressing is preferably, but not limited to, 80 to 250° C. for polyvinyl alcohol. If a hot-pressing temperature is lower than 80° C., the charge-mosaic layer (C) obtained may have insufficient mechanical strength. The temperature is more preferably 100° C. or higher, further preferably 130° C. or higher. If a hot-pressing temperature is higher than 250° C., polyvinyl alcohol may melt. The press temperature is more preferably 230° C. or lower, further preferably 200° C. or lower.

In a method for manufacturing a multilayered charge-mosaic membrane of the present invention, it is preferable that after forming the charge-mosaic layer (C), it is crosslinked. Crosslinking increases mechanical strength of the resulting charge-mosaic layer. Furthermore, a charge density increases, resulting in improvement in counter-ion selectivity. There are no particular restrictions to a crosslinking method as long as it can chemically bind molecular chains in the polymer. The method is generally immersing the charge-mosaic layer (C) in a solution containing a crosslinking agent. Examples of the crosslinking agent include glutaraldehyde, formaldehyde and glyoxal. A concentration of the crosslinking agent is generally, as a volume concentration, 0.001 to 1% by volume in the solution.

In the above producing process, all of annealing, hot-pressing and crosslinking can be conducted, or alternatively two or one of these can be conducted. There are no particular restrictions to the order of these processes. Multiple processes can be conducted simultaneously. Preferably, crosslinking is conducted after annealing or hot-pressing. It is because annealing or hot-pressing causes formation of sites in susceptible to crosslinking and then, after crosslinking, particularly chemical crosslinking, crosslinked and uncrosslinked sites coexist, resulting in improvement in membrane strength. The order of hot-pressing, annealing and crosslinking is particularly preferable in the light of mechanical strength of a multilayered charge-mosaic membrane obtained. Furthermore, when the charge-mosaic layer (C) is a water-soluble polymer, the annealing, the hot-pressing, the cross-linking or the like described above can be conducted to prevent the charge-mosaic layer (C) from dissolution during the use of the multilayered charge-mosaic membrane.

A multilayered charge-mosaic membrane of the present invention can contain various additives such as inorganic fillers as far as the effect of the present invention is not adversely affected.

A charge density of a multilayered charge-mosaic membrane of the present invention is preferably, but not limited to, 0.1 to 20 $mol \cdot dm^{-3}$. If the charge density is less than 0.1 $mol \cdot dm^{-3}$, counter-ion selectivity of the membrane may be deteriorated. The charge density is more preferably 0.3 $mol \cdot dm^{-3}$ or more, further preferably 0.5 $mol \cdot dm^{-3}$ or more. If the charge density of the membrane is more than 20 $mol \cdot dm^{-3}$, the membrane may be so swollen that its dimensional stability becomes insufficient, leading to difficulty in handling. The charge density of the membrane is more preferably 10 $mol \cdot dm^{-3}$ or less, further preferably 3 $mol \cdot dm^{-3}$ or less.

A multilayered charge-mosaic membrane of the present invention can be used in various applications. Furthermore, exhibiting a large salt permeation flux and excellent electrolyte permselectivity, a multilayered charge-mosaic membrane of the present invention is suitable for water purification, desalination of foods or raw materials for drugs, desalination of brackish water and seawater and water conversion. Having excellent mechanical strength, a multilayered charge-mosaic membrane of the present invention is particularly suitable for piezodialysis. According to a method for manufacturing a multilayered charge-mosaic membrane of the present invention, a large-area membrane can be easily produced at low cost.

EXAMPLES

The present invention will be detailed with reference to Examples. In the examples and comparative examples, unless otherwise indicated, "%" and "part(s)" are by weight. Analyses and evaluations in these examples and comparative examples were conducted as described below.

(1) Measurement of a Thickness for a Porous Supporting Layer (A), a Porous Intermediate Layer (B) and a Charge-Mosaic Layer (C)

A multilayered charge-mosaic membrane was immersed in ion-exchanged water at 25° C. for 5 days or more to achieve swelling equilibrium, and a section sample was cut by a surgical knife. Then, the sample was immersed in a $5 \times 10^{-5}$ mol/L solution of Methyl Violet in ion-exchanged water for 30 min for staining cationic polymer domain regions to prepare a measurement sample. The section of the measurement sample thus prepared was, after drying, observed by a light microscope "OPTIPHOT-2" from Nikon Corporation and the image data obtained were analyzed by "NIS-Elements.D.2.30" from Nikon Corporation to calculate a thickness of a charge-mosaic layer (C). Likewise, thicknesses of a porous supporting layer (A) and a porous intermediate layer (B) were calculated. The thickness values thus obtained are for dry samples.

(2) Measurement of Porosity for a Porous Supporting Layer (A) and a Porous Intermediate Layer (B)

A porosity was determined from the following equation.

Porosity (%)={1−[basis weight (g/m$^2$)/thickness (μm)]/resin density (g/cm$^3$)}×100

Calculation was conducted assuming that a polyethylene terephthalate and a polyvinyl alcohol has a density of 1.3 (g/cm$^3$) and polyamide-9T has a density of 1.1 (g/cm$^3$), respectively.

(3) Measurement of Air Permeability

For a porous supporting layer (A) and a multilayer structure (D), a permeation time for 100 mL of air was measured using a Gurley type densometer in accordance with JIS P8117. For a multilayered charge-mosaic membrane, it was measured by the Oken air permeability test in accordance with the JAPAN TAPPI paper and pulp test method No. 5.

(4) Measurement of Smoothness

Smoothness was measured using an Oken air permeability smoothness tester No. 2040-C (Kumagai Riki Kogyo Co., Ltd.) in accordance with the Oken smoothness test employing the JAPAN TAPPI paper and pulp test method No. 5.

(5) Measurement of an Average Fiber Diameter for a Porous Intermediate Layer (B) Made of a Fiber Layer Au was vapor-deposited on a multilayer structure (D) having a porous intermediate layer (B) formed on a porous supporting layer (A) using a magnetron sputter coater "MPS-1S" (Vacuum Device Inc.). Then, the nanofiber surface of the porous intermediate layer (B) was observed by an electron microscope "VE-7800" (Keyence Corporation), to obtain a surface image. The image obtained was processed using an image processing software "WINROOF" from Mitani Corporation, to determine an average fiber diameter of the porous intermediate layer (B). Choosing 100 measurement points in the porous intermediate layer (B) at random, an average fiber diameter was calculated.

(6) Measurement of a Shrinking Percentage

A multilayer structure (D) was cut into a square of 35 cm×35 cm and two points separate from each other at a distance of exactly 30 cm in the MD direction were punch marked. Next, the sample was immersed in ion-exchanged water at 25° C. for 10 sec and then dried at 105° C. for 2 hours in a hot-air dryer. For the resulting membrane, a distance between the punch marks was measured and a shrinking percentage was calculated in accordance with the following equation. From the results, a shrinking percentage was rated according to the following three-level criteria.

A: a shrinking percentage of less than 0.5%
B: a shrinking percentage of 0.5% or more and less than 2%
C: a shrinking percentage of 2% or more Shrinking percentage (%)=(distance between two punch marks before water immersion−distance between two marks after water immersion and drying)/distance between two punch marks before water immersion×100

(7) Test for Strength in Water

A multilayered charge-mosaic membrane was cut into a strip with a width of 15 mm in the MD direction. Then, the sample was examined by a tensile test in water at 25° C. at a tension rate of 20 mm/min using a tensile tester AGS-100G (Shimadzu Corporation).

(8) Piezodialysis Test

A piezodialysis test was conducted using the apparatus shown in FIG. 1. A measurement sample of a multilayered charge-mosaic membrane 3 held by a folder was sandwiched by two cells. Cell I 6 in which a conductivity electrode "3552-10D" from Horiba, Ltd. had been inserted was charged with 30 mL of an aqueous solution of NaCl at a predetermined concentration while cell II 7 was charged with 30 mL of an aqueous solution of NaCl at the same concentration as cell I 6. Subsequently, while the aqueous solutions in both cells were stirred by a stirring bar 4, nitrogen gas was introduced into the side of cell II 7 from a nitrogen gas cylinder 1 for maintaining a constant pressure. At the same time, an electric conductivity in cell I 6 was measured at a constant temperature of 25° C. using a conductivity meter 5. Immediately after the test, the weight of the aqueous solution of NaCl in cell I 6 was measured.

For NaCl concentrations in cell I 6 thus measured, a variation curve over time was determined, and a time rate of concentration change $\Delta C^I_S/\Delta t$ was calculated from the initial slope of the straight line. Furthermore, the weight of the aqueous solution of NaCl in cell I 6 was measured and $\Delta M^I$ was determined from a weight difference between before and after the test and a time rate of change in a mole number of water $\Delta M^I/(S\times\Delta t)$ was calculated.

An NaCl flux $J_S$ was calculated from the following equation.

$$J_S = V^I \times \Delta C^I_S/(S \times \Delta t) \times 1000$$

A water flux $J_W$ was calculated from the following equation.

$$J_W = \Delta M^I/(S \times \Delta t)$$

wherein $J_S$: NaCl component flux [mol·m$^{-2}$·s$^{-1}$]
$V^I$: the amount of ion-exchanged water in cell I [m$^3$]
S: a membrane effective area of the multilayered charge-mosaic membrane [m$^2$]
$\Delta C^I_S$: change in an initial concentration of NaCl component in cell I [mol/L]
$\Delta t$: permeation time [s]
$\Delta M^I$: change in an initial mole number of the aqueous solution of NaCl in cell I [mol]

Using a permeation flux for NaCl ($J_S$) and a water flux ($J_W$), a permselectivity α of water to NaCl for the multilayered charge-mosaic membrane was calculated from the following equation.

$$\alpha = J_W/J_S$$

(Synthesis of Cationic Polymer P-1)

In a 6 liter separable flask equipped with a stirrer, a temperature sensor, a dropping funnel and a reflux condenser were charged 2975 g of vinyl acetate, 525 g of methanol and 83.9 g of a 20% by weight solution of methacrylamidopropyltrimethylammonium chloride in methanol, and after the atmosphere of the system was substituted with nitrogen under stirring, the mixture was heated to an internal temperature of 60° C. To the mixture was added 20 g of methanol containing 0.8 g of 2,2'-azobisisobutyronitrile (AIBN), to initiate a polymerization reaction. The polymerization reaction was continued for 4 hours while 222 g of a 20% by weight solution of methacrylamidopropyltrimethylammonium chloride in methanol was added to the reaction solution from the initiation of the polymerization, and then the polymerization reaction was terminated. At the terminating of the polymerization reaction, a solid concentration in the reaction solution, that is, a nonvolatile content to the whole reaction solution, was 21.5% by weight. Next, unreacted vinyl acetate monomer was expelled by introducing methanol vapor into the system to provide a 55% by weight solution of a vinyl ester copolymer in methanol.

To the 55% by weight solution of a vinyl ester copolymer in methanol were, under stirring, sequentially added methanol and a 10% by weight solution of sodium hydroxide in methanol such that a molar ratio of sodium hydroxide to a vinyl acetate unit in the copolymer was 0.02 and the vinyl ester copolymer was contained in a solid concentration of 30% by weight, and a saponification reaction was initiated at 40° C.

Immediately after a gelated material was formed as the saponification reaction proceeded, the material was removed from the reaction system and pulverized, and then one hour after the formation of the gelated material, the pulverized material was neutralized by adding acetic acid to provide a swollen solid. Six times the mass of methanol was added to the solid (liquor ratio: 6), and the polymer was washed under reflux for one hour. Then, the solid was collected by filtration and dried at 65° C. for 16 hours, to give a cationic polymer P-1 as a random copolymer of poly(vinyl alcohol-methacrylamidopropyltrimethylammonium chloride). The resulting cationic polymer P-1 was dissolved in deuterium oxide and analyzed by $^1$H-NMR at 400 MHz, which indicated that a content of the cationic monomer in the cationic polymer, that is, a proportion of the number of a methacrylamidopropyltrimethylammonium chloride monomer unit to the total number of monomer units in the polymer, was 2 mol %. A polymerization degree was 2400 and a saponification degree was 98.5 mol %.

(Synthesis of an Anionic Polymer P-2)

An anionic polymer P-2 was produced as described for the cationic polymer P-1, except that the polymerization conditions such as the types and the initial amounts of vinyl acetate, methanol (MeOH) and an anionic monomer, the amount of a polymerization initiator (AIBN) and the portionwise addition amount of the anionic monomer, and the conditions of a saponification reaction were changed as shown in Table 1. The physical properties of the polymers prepared are shown in Table 1.

(Synthesis of PVA-1 and PVA-2)

According to the process described in Patent Reference 5 (a polyvinyl alcohol polymer containing a mercapto group at polymer end and a process therefor), a polyvinyl alcohol PVA-1 containing a mercapto group at polymer end was synthesized. The PVA-1 thus prepared had a polymerization degree of 1550 and a saponification degree of 98.5 mol %. Likewise, a polyvinyl alcohol PVA-2 containing a mercapto group at polymer end was synthesized. The PVA-2 thus prepared had a polymerization degree of 550 and a saponification degree of 98.5 mol %.

(Synthesis of a Cationic Polymer P-3)

In a 5-liter four-necked separable flask equipped with a reflux condenser and a stirring blade were charged 1900 g of water and 344 g of PVA-1 as a polyvinyl alcohol containing a mercapto group at polymer end, and the mixture was heated with stirring to 95° C. for dissolving the polyvinyl alcohol and then cooled to room temperature. To the aqueous solution was added ½N sulfuric acid to adjust pH to 3.0. Separately, 179 g of vinylbenzyltrimethylammonium chloride was dissolved in 300 g of water, and the resulting solution was added to the previous aqueous solution with stirring, and then the aqueous solution was heated to 70° C. while nitrogen was bubbled into the solution, and nitrogen bubbling was continued at 70° C. for further 30 min to replacing the atmosphere by nitrogen. After the replacement by nitrogen, to the aqueous solution was added portionwise 121 mL of a 2.5% aqueous solution of potassium persulfate (KPS) over 1.5 hours to initiate block co-polymerization which was then allowed to proceed. The polymerization was allowed to further proceed by maintaining a system temperature at 75° C. for one hour, and the reaction was then cooled to give an aqueous solution of a cation polymer P-3 as a block copolymer of polyvinyl alcohol-polyvinylbenzyltrimethylammonium chloride with a solid content of 18%. A part of the resulting aqueous solution was dried, then dissolved in deuterium oxide and analyzed by $^1$H-NMR at 400 MHz, which indicated that a cationic monomer content in the block copolymer, that is, a proportion of the number of the vinylbenzyltrimethylammonium chloride monomer unit to the total number of monomer units in the polymer was 10 mol %.

(Synthesis of Cationic Polymers P-4 and P-5)

Cationic polymers P-4 and P-5 as a block copolymer were synthesized as described for the cationic polymer P-3, replacing the polymerization conditions such as the type and the amount of a polyvinyl alcohol containing a mercapto group at polymer end, the type and the amount of a cationic monomer,

TABLE 1

| | | Polymerization conditions | | | | | | |
|---|---|---|---|---|---|---|---|---|
| | | Ionic-group containing monomer | | | Initial | Polymerization | | |
| | Vinyl acetate (g) | Type | Concentration of MeOH solution (%) | Initial amount (g) | Portionwise addition amount (g) | amount of MeOH (g) | initiator (AIBN) (g) | Polymerization time (hr) | Solid concentration (wt %) |
| P-1 | 2975 | MAPTAC[1] | 20 | 83.9 | 222 | 525 | 0.8 | 4 | 21.5 |
| P-2 | 2975 | AMPS[2] | 25 | 40.8 | 192 | 525 | 0.8 | 4 | 21.6 |

| | | | | Cationic or anionic polymer | |
|---|---|---|---|---|---|
| | Saponification conditions | | Saponification degree (mol %) | Polymerization degree | Content of a cationic or anionic monomer (mol %) |
| | Saponification concentration (wt %) | NaOH molar ratio | | | |
| P-1 | 30 | 0.02 | 98.5 | 2400 | 2 |
| P-2 | 30 | 0.02 | 98.5 | 2400 | 2 |

[1]MAPTAC: methacrylamidopropyltrimethylammonium chloride
[2]AMPS: sodium 2-acrylamido-2-methylpropanesulfonate the amount of water and the amount of a polymerization initiator (potassium persulfate) with those described in Table 2. The physical properties of the cationic polymers P-4 and P-5 thus obtained are shown in Table 2.

(B) made of a fiber layer on the porous supporting layer (A). In the multilayer structure (D) produced, the porous intermediate layer (B) had a basis weight of 2 g/m² and an average fiber diameter of 300 nm. Here, in the multilayer structure

TABLE 2

| | Polymerization conditions | | | | | | | | Block copolymer | | |
|---|---|---|---|---|---|---|---|---|---|---|---|
| | PVA polymer | | Cationic monomer | | | Polymerization initiator (KPS) | | Polymerization | Solid concen- | 4% | Cationic monomer |
| | Type | Amount (g) | Type | Amount (g) | Water (g) | Concentration (wt %) | Amount (mL) | time (hr) | tration (wt %) | Viscosity (mPa · s) | content (mol %) |
| P-3 | PVA-1 | 344 | VTMAC[1] | 179 | 2200 | 2.5 | 121 | 1.5 | 18 | 18 | 10 |
| P-4 | PVA-1 | 344 | DADMAC[2] | 134 | 2000 | 2.5 | 121 | 1.5 | 18 | 18 | 10 |
| P-5 | PVA-2 | 344 | MAPTAC[3] | 183 | 1350 | 2.5 | 176 | 1.5 | 25 | 6 | 10 |

[1]VTMAC: vinylbenzyltrimethylammonium chloride
[2]DADMAC: diallyldimethylammonium chloride
[3]MAPTAC: methacrylamidopropyltrimethylammonium chloride (Synthesis of Anionic Polymers P-6 and P-7)

Anionic polymers P-6 and P-7 as a block copolymer were synthesized as described for the cationic polymer P-3, replacing the polymerization conditions such as the type and the amount of a polyvinyl alcohol containing a mercapto group at polymer end, the type and the amount of an anionic monomer, the amount of water and the amount of a polymerization initiator (potassium persulfate) with those described in Table 3. The physical properties of the anionic polymers P-6 and P-7 thus obtained are shown in Table 3.

(D), the porous supporting layer (A) had a thickness of 76 μm and the porous intermediate layer (B) had a thickness of 3.7 μm. The properties of substrate-1 produced are shown in Table 4.

(Production of Substrate-2)

A porous supporting layer (A) and a porous intermediate layer (B) were formed as described for substrate-1. A multilayer structure (D) having the porous intermediate layer (B) on the porous supporting layer (A) was hot-pressed under the conditions of temperature: 80° C. and pressure: 10 kgf/cm²

TABLE 3

| | Polymerization conditions | | | | | | | | Block copolymer | | |
|---|---|---|---|---|---|---|---|---|---|---|---|
| | PVA polymer | | Anionic monomer | | | Polymerization initiator (KPS) | | Polymerization | Solid concen- | 4% | Anionic monomer |
| | Type | Amount (g) | Type | Amount (g) | Water (g) | Concentration (wt %) | Amount (mL) | time (hr) | tration (wt %) | Viscosity (mPa · s) | content (mol %) |
| P-6 | PVA-1 | 344 | PStSS[1] | 172 | 2200 | 2.5 | 121 | 1.5 | 18 | 18 | 10 |
| P-7 | PVA-2 | 344 | AMPS[2] | 190 | 1340 | 2.5 | 192 | 1.5 | 25 | 6 | 10 |

[1]PStSS: sodium p-styrenesulfonate
[2]AMPS: sodium 2-acrylamido-2-methylpropanesulfonate (Production of Substrate-1)

(1) Eighty % by weight of PVA main fiber (Kuraray Co., Ltd., "VPB102×5"; 1.1 dtex×5 mm) and 20% by weight of PVA binder fiber (Kuraray Co., Ltd., "VPB105×1"; 1.1 dtex (equivalent circle diameter: 10 μm)×3 mm, dissolution temperature in water: 70° C.) were mixed to prepare a starting material, from which a paper was made by a Fourdrinier paper machine. The paper was dried in a Yankee dryer to obtain a porous supporting layer (A) made of a wet-laid nonwoven fabric substrate having a basis weight of 30.0 g/m² and a thickness of 76 μm.

(2) PVA124 (Kuraray Co., Ltd; polymerization degree: 2400, saponification degree: 98.5 mol %) was added to water to 10% by weight and then dissolved at 90° C. with stirring to give a completely dissolved solution, which was then cooled to an ordinary temperature to provide a spinning solution. In a nanofiber electrospinning unit (Kato Tech Co., Ltd.), the solution obtained was electrospun on the porous supporting layer (A) obtained in (1) under the conditions of needle inner diameter: 0.9 mm, interelectrode distance: 8 cm, conveyer speed: 0.1 m/min and applied voltage: 20 kV, to provide a multilayer structure (D) having a porous intermediate layer for one minute by a hot press to give substrate-2. Here, in the multilayer structure (D), the porous supporting layer (A) had a thickness of 65 μm and the porous intermediate layer (B) had a thickness of 3 μm. The properties of substrate-2 produced are shown in Table 4.

(Production of Substrate-3)

A porous supporting layer (A) and a porous intermediate layer (B) were formed as described for substrate-1. A multilayer structure (D) having the porous intermediate layer (B) on the porous supporting layer (A) was hot-pressed under the conditions of temperature: 140° C. and pressure: 10 kgf/cm² for one minute by a hot press to give substrate-3. Here, in the multilayer structure (D), the porous supporting layer (A) had a thickness of 58 μm and the porous intermediate layer (B) had a thickness of 2.4 μm. The properties of substrate-3 produced are shown in Table 4.

(Production of Substrate-4)

(1) Eighty % by weight of PVA main fiber (Kuraray Co., Ltd., "VPB102×5"; 1.1 dtex×5 mm) and 20% by weight of PVA binder fiber (Kuraray Co., Ltd., "VPB105×1"; 1.1 dtex (equivalent circle diameter: 10 μm)×3 mm, dissolution temperature in water: 70° C.) were mixed to prepare a starting material, from which a paper was made by a Fourdrinier paper machine. The paper was dried in a Yankee dryer to obtain a porous supporting layer (A) made of a wet-laid nonwoven fabric substrate having a basis weight of 30.0 g/m² and a thickness of 54 µm.

(2) In a dissolver was placed a preliminarily opened pulp (Western pulp, polymerization degree DP=621, ALICELL), which was heated at 80° C. and then allowed to stand for 1 hour. Separately, to liquid N-methylmorpholine-N-oxide hydrate heated to 90° C. were added n-propyl gallate as a solution stabilizer in an amount of 0.25% by weight based on the pulp and sodium lauryl sulfate as a surfactant in an amount of 0.25% by weight with stirring, to prepare a solution. Subsequently, the solution was sprayed on the pulp heated in the above dissolver, and after closing the lid of the dissolver, the system atmosphere was replaced with nitrogen. After leaving for 30 min to adequately swell the pulp, the mixture was stirred by a stirrer equipped in the dissolver for one hour to make the pulp completely dissolved. Then, the dissolver was heated to a temperature of 100° C., and the mixture was allowed to stand without stirring for 4 hours for degassing to provide a spinning solution. In a nanofiber electrospinning unit (Kato Tech Co., Ltd.), the solution obtained was electrostatically spun on the porous supporting layer (A) obtained in (1) under the conditions of needle inner diameter: 0.9 mm, interelectrode distance: 8 cm, conveyer speed: 0.1 m/min and applied voltage: 20 kV, to provide a multilayer structure (D) having a porous intermediate layer (B) made of a fiber layer on the porous supporting layer (A). In the multilayer structure (D) produced, the porous intermediate layer (B) had a basis weight of 2 g/m² and an average fiber diameter of 250 nm. Here, in the multilayer structure (D), the porous supporting layer (A) had a thickness of 54 µm and the porous intermediate layer (B) had a thickness of 2.5 µm. The properties of substrate-4 produced are shown in Table 4.

(Production of Substrate-5 and Substrate-6)

In producing substrate-5 and substrate-6, a porous supporting layer (A) was formed as described for substrate-1. For substrate-6, hot-pressing of the porous supporting layer (A) was conducted under the conditions described in Table 4 and a porous intermediate layer (B) was not formed. Here, in substrate-5 and substrate-6, a thickness of the porous supporting layer (A) was 76 µm and 13 µm, respectively. The properties of substrate-5 and substrate-6 produced are shown in Table 4.

composite binder fiber (trade name: EP101×5 (EM), Kuraray Co., Ltd. (1.1 dtex (equivalent circle diameter: 10 µm)×5 mm)) were mixed to prepare a starting material, from which a paper was made by a Fourdrinier paper machine. The paper was dried in a Yankee dryer to obtain a porous supporting layer (A) made of a wet-laid nonwoven fabric substrate having a basis weight of 30 g/m² and a thickness of 65 µm.

(2) PVA124 (Kuraray Co., Ltd; polymerization degree: 2400, saponification degree: 98.5 mol %) was added to water to 10% by weight and then dissolved at 90° C. with stirring to give a completely dissolved solution, which was then cooled to an ambient temperature to provide a spinning solution. With using a nanofiber electrospinning unit (Kato Tech Co., Ltd.), the solution obtained was electrostatically spun on the porous supporting layer (A) obtained in (1) under the conditions of needle inner diameter: 0.9 mm, interelectrode distance: 8 cm, conveyer speed: 0.1 m/min and applied voltage: 20 kV, to provide a multilayer structure (D) having a porous intermediate layer (B) made of a fiber layer on the porous supporting layer (A). In the multilayer structure (D) produced, the porous intermediate layer (B) had a basis weight of 3 g/m² and an average fiber diameter of 300 nm. The multilayer structure (D) obtained was hot-pressed for 1 min under the conditions of temperature: 100° C. and pressure: 10 kgf/cm² by a hot press. The properties of substrate-7 produced are shown in Table 5.

(Production of Substrate-8)

(1) A porous supporting layer (A) was formed as described for substrate-7. Next, 100 parts by weight of an anchor coating agent AD335AE (Toyo-Morton, Ltd.) was combined with 10 parts by weight of a catalyst CAT-10 (Toyo-Morton Ltd.) in an equivolume mixture of toluene/methyl ethyl ketone to prepare a 10 wt % solution. This solution was applied to the surface of the porous supporting layer (A) by a wire bar, and dried at 80° C. for 1 min in a hot-air drier. The amount of application of the adhesive layer was 0.3 g/m².

(2) PVA124 (Kuraray Co., Ltd; polymerization degree: 2400, saponification degree: 98.5 mol %) was added to water to 10% by weight and then dissolved at 90° C. with stirring to give a completely dissolved solution, which was then cooled to an ambient temperature to provide a spinning solution. With using a nanofiber electrospinning unit (Kato Tech Co., Ltd.), the solution obtained was electrospun on the porous supporting layer (A) obtained in (1) under the conditions of needle inner diameter: 0.9 mm, interelectrode distance: 8 cm,

TABLE 4

| | Porous supporting layer (A) | | | | Porous intermediate layer (B) | | | | | Multilayer structure (D) | | | |
|---|---|---|---|---|---|---|---|---|---|---|---|---|---|
| | Basis weight (g/m2) | Air permeability (sec) | Smoothness (sec) | Fiber diameter (µm) | Resin | Basis weight (g/m2) | Smoothness (sec) | Fiber diameter (nm) | Hot-press conditions Temp. (° C.) | Hot-press conditions Time (min) | Shrinking percentage (%) | Air permeability (sec) | Smoothness (sec) |
| Substrate-1 | 30 | 0.3 | 5 | 10 | PVA[1] | 2 | 35 | 300 | — | — | C | 2 | 35 |
| Substrate-2 | 30 | 0.3 | 5 | 10 | PVA[1] | 2 | 35 | 300 | 80 | 1 | C | 3 | 180 |
| Substrate-3 | 30 | 0.3 | 5 | 10 | PVA[1] | 2 | 35 | 300 | 140 | 1 | C | 5 | 300 |
| Substrate-4 | 30 | 0.3 | 5 | 10 | Cellulose[2] | 2 | 35 | 250 | 140 | 1 | C | 5 | 300 |
| Substrate-5 | 30 | 0.3 | 5 | 10 | | — | | | | | C | 0.3 | 5 |
| Substrate-6 | 30 | 0.3 | 5 | 10 | | — | | | 230 | 5 | C | 150 | 310 |

[1] Polymerization degree: 2400, saponification degree: 98 mol %
[2] Prepared from Western pulp (from ALICELL)

(Production of Substrate-7)

(1) Sixty % by weight of a polyethylene terephthalate fiber (trade name: EP053×5 (EM), Kuraray Co., Ltd. (0.84 dtex×5 mm)) and 40% by weight of a polyethylene terephthalate conveyer speed: 0.1 m/min and applied voltage: 20 kV, to provide a multilayer structure (D) having a porous intermediate layer (B) made of a fiber layer on the porous supporting layer (A). In the multilayer structure (D) produced, the porous intermediate layer (B) had a basis weight of 3 g/m² and an average fiber diameter of 300 nm. The multilayer structure (D) obtained was hot-pressed for 1 min under the conditions of temperature: 100° C. and pressure: 10 kgf/cm² by a hot press. The properties of substrate-8 produced are shown in Table 5.

supporting layer (A). In the multilayer structure (D) produced, the porous intermediate layer (B) had a basis weight of 3 g/m² and an average fiber diameter of 250 nm. The multilayer structure (D) obtained was hot-pressed for 1 min under the conditions of temperature: 180° C. and pressure: 10 kgf/cm² by a hot press. The properties of substrate-10 produced are shown in Table 5.

TABLE 5

| | Porous supporting layer (A) | | | | | | Porous intermediate layer (B) | | | |
|---|---|---|---|---|---|---|---|---|---|---|
| | Resin | Basis weight (g/m2) | Air permeability (sec) | Smoothness (sec) | Fiber diameter (μm) | Adhesive layer | Resin | Basis weight (g/m2) | Smoothness (sec) | Fiber diameter (nm) |
| Substrate-7 | Polyethylene terephthalate | 30 | 0.3 | 5 | 10 | None | PVA[1] | 3 | 35 | 300 |
| Substrate-8 | Polyethylene terephthalate | 30 | 0.3 | 5 | 10 | AD335AE | PVA[1] | 3 | 35 | 300 |
| Substrate-9 | Polyethylene terephthalate | 30 | 0.3 | 5 | 10 | AD335AE | PVA[1] | 3 | 35 | 300 |
| Substrate-10 | PA-9T | 30 | 0.3 | 5 | 10 | None | EVOH[2] | 3 | 35 | 250 |

| | Multilayer structure (D) | | | | |
|---|---|---|---|---|---|
| | Hot-press conditions | | Shrinking percentage (%) | Air permeability (sec) | Smoothness (sec) |
| | Temp. (° C.) | Time (min) | | | |
| Substrate-7 | 100 | 1 | B | 2 | 35 |
| Substrate-8 | 100 | 1 | B | 2 | 35 |
| Substrate-9 | 200 | 1 | B | 3 | 180 |
| Substrate-10 | 180 | 1 | A | 5 | 300 |

[1])Polyvinyl alcohol; polymerization degree2400, saponification degree 98 mol %
[2])Ethylene vinylalcohol copolymer; ethylene modification amount 32 mol %

(Production of Substrate-9)

A porous supporting layer (A) having an adhesive layer and a porous intermediate layer (B) were formed as described for substrate-8. The multilayer structure (D) obtained was hot-pressed for 1 min under the conditions of temperature: 200° C. and pressure: 10 kgf/cm² by a hot press. The properties of substrate-9 produced are shown in Table 5.

(Production of Substrate-10)

(1) Seventy % by weight of a polyamide-9T fiber (trade name: A590, Kuraray Co., Ltd. (0.8 dtex×5 mm)) and 30% by weight of a polyethylene terephthalate composite binder fiber (EP101×5(EM), Kuraray Co., Ltd., (1.1 dtex (equivalent circle diameter: 10 μm)×5 mm)) were mixed to prepare a starting material, from which a paper was made by a Fourdrinier paper machine. The paper was dried in a Yankee dryer to obtain a porous supporting layer (A) made of a wet-laid nonwoven fabric substrate having a basis weight of 30 g/m² and a thickness of 70 μm.

(2) An ethylenevinyl alcohol copolymer (ethylene modification rate: 32 mol %) was added to dimethyl sulfoxide to 10% by weight and then dissolved at 90° C. with stirring to give a completely dissolved solution, which was then cooled to an ambient temperature to provide a spinning solution. With using a nanofiber electrospinning unit (Kato Tech Co., Ltd.), the solution obtained was electrostatically spun on the porous supporting layer (A) obtained in (1) under the conditions of needle inner diameter: 0.9 mm, interelectrode distance: 8 cm, conveyer speed: 0.1 m/min and applied voltage: 20 kV, to provide a multilayer structure (D) having a porous intermediate layer (B) made of a fiber layer on the porous Example 1

(Production of a Multilayered Charge-Mosaic Membrane)

Figure 2:
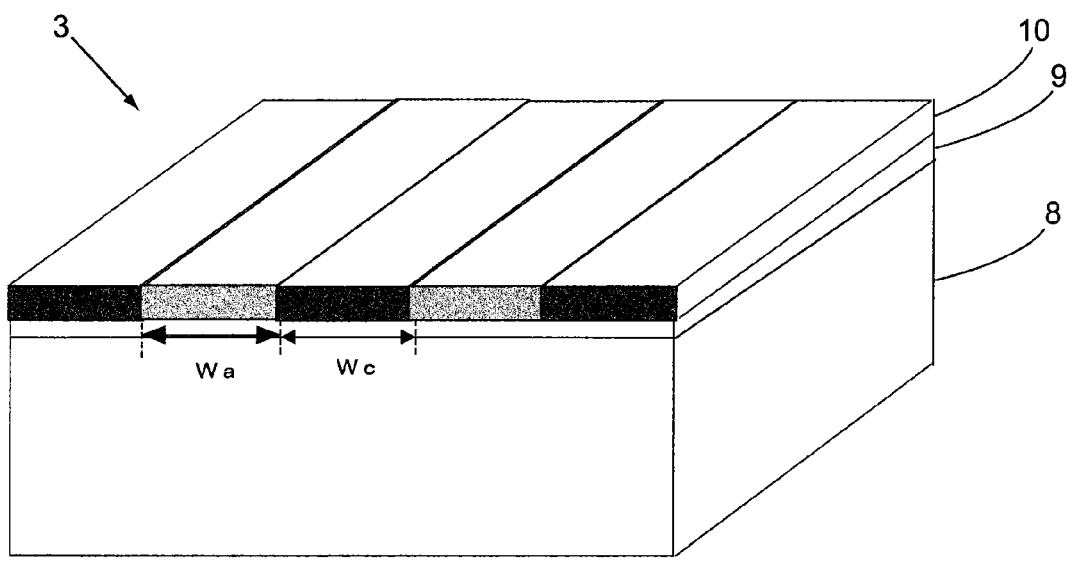
FIG. 2 shows a multilayered charge-mosaic membrane in which a charge-mosaic layer (C) is printed in a striped manner.

In a 200 mL Erlenmeyer flask were placed 90 mL of deionized water and then 22.5 g of the cationic polymer P-1, and then the mixture was heated in a water bath at 95° C., to dissolve the polymer P-1. Then, to the mixture was added deionized water to prepare an aqueous solution of the cationic polymer at a concentration of 17%. The viscosity of the solution was 87,000 mPa·s (20° C.). In a separate 200 mL Erlenmeyer flask were placed 90 mL of deionized water and then 22.5 g of the anionic polymer P-2, and then the mixture was heated in a water bath at 95° C., to dissolve the polymer P-2. Then, to the mixture was added deionized water to prepare an aqueous solution of the anionic polymer at a concentration of 17%. The viscosity of the solution was 85,000 mPa·s (20° C.). First, the aqueous solution of the cationic polymer P-1 was applied on substrate-1 using a screen printer LS-34TV (Newlong Seimitsu Kogyo Co., Ltd.) to print the We regions in the striped printed matter shown in FIG. 2, and the printed matter was dried in a hot-air dryer at 50° C. for 10 min. Then, likewise, the aqueous solution of the anionic polymer P-2 was applied by the screen printer to print the Wa regions shown in FIG. 2, and the printed matter was dried in a hot-air dryer at 50° C. for 10 min. For the multilayered charge-mosaic membrane 3 thus produced, a thickness of the charge-mosaic layer (C) 10 measured by a shape measurement laser microscope VK-970 (Keyence Corp.) was 4.5 μm. Here, a thickness of the porous supporting layer (A) 8 was 76 μm and a thickness of the porous intermediate layer (B) 9 was 3.7 µm. Furthermore, an air permeability of the multilayered charge-mosaic membrane 3 produced was 100,000 sec or more and ∞ or less. Here, "∞ or less" in measurement of an air permeability denotes a measuring limit or less.

The multilayered charge-mosaic membrane thus obtained was annealed using a hot-air dryer at 170° C. for 30 min, to form physical crosslinking. Subsequently, the film was immersed in a 2 mol/L aqueous solution of an electrolyte, sodium sulfate for 24 hours. To the aqueous solution was added concentrated sulfuric acid to adjust the pH of the aqueous solution to 1, and then the film was immersed in a 0.05% by volume aqueous solution of glutaraldehyde, which was then stirred by a stirrer at 25° C. for 24 hours to conduct crosslinking. Here, the aqueous solution of glutaraldehyde was prepared by diluting glutaraldehyde (25% by volume) from Ishizu Chemicals Co. with water. After the crosslinking, the film was immersed in deionized water until the film reached swelling equilibrium, during which deionized water was replaced several times. Table 6 summarizes the above producing process.

(Evaluation of a Multilayered Charge-Mosaic Membrane)

The multilayerd charge-mosaic membrane thus produced was cut into pieces with a desired size, which were used as samples for measurement. The measurement samples obtained were subjected to a piezodialysis test according to the above-described method. The results obtained are shown in Table 7.

Examples 2 to 5 and 8

A multilayered charge-mosaic membrane was produced and evaluated as described in Example 1, replacing the types of a cationic and an anionic polymers used, concentrations of aqueous solutions of a cationic and an anionic polymers prepared, the type of a substrate and an annealing temperature by those described in Table 6. The production process and the results are shown in Tables 6 and 7, respectively.

Example 6

A multilayered charge-mosaic membrane was produced and evaluated as described in Example 4, substituting a 5% aqueous solution of a cationic polymer prepared from the cationic polymer P-5 for the cationic polymer P-3, a 5% aqueous solution of an anionic polymer prepared from the anionic polymer P-6 for the anionic polymer P-6, and an ink-jet printer for the screen printer. The production process and the results are shown in Tables 6 and 7, respectively. Here, the ink-jet printer was "NanoPrinter 1100D" from Microjet Corporation. The aqueous solution of a cationic polymer had a viscosity of 12 mPa·s (20° C.) and the aqueous solution of an anionic polymer had a viscosity of 12 mPa·s (20° C.).

Example 7

A multilayered charge-mosaic membrane was produced and evaluated as described in Example 4, except that concentrations of aqueous solutions of a cationic and an anionic polymers prepared were those described in Table 6 and a dispenser printer was used in place of the screen printer. The production process and the results are shown in Tables 6 and 7, respectively. Here, the dispenser printer was "SHOTMASTER500" from Musashi Engineering Inc. The 15% aqueous solution of the cationic polymer P-3 had a viscosity of 3000 mPa·s (20° C.), and the 15% aqueous solution of the anionic polymer P-6 had a viscosity of 3000 mPa·s (20° C.).

Comparative Examples 1 to 3

A charge-mosaic membrane was produced as described in Example 2, except that a substrate used in screen printing was a substrate described in Table 6. The production process is shown in Table 6. The results are shown in Table 7. In Comparative Examples 1 and 3, a test liquid leaked from the pressing side to the low-pressure side during the piezodialysis test, so that membrane properties failed to be evaluated.

TABLE 6

| | | Cationic polymer domain | | | Anionic polymer domain | | | | |
|---|---|---|---|---|---|---|---|---|---|
| | Substrate | Cationic polymer | Concentration of polymer aqueous solution (wt %) | Viscosity of polymer aqueous solution (mPa·s) | Anionic polymer | Concentration of polymer aqueous solution (wt %) | Viscosity of polymer aqueous solution (mPa·s) | Printing method | Annealing Temperature (° C.) | Air permeability*) (sec) |
| Example 1 | Substrate-1 | P-1 | 17 | 87,000 | P-2 | 17 | 85,000 | Screen printing | 170 | 100,000 sec or more and ∞ or less |
| Example 2 | Substrate-1 | P-3 | 18 | 50,000 | P-6 | 18 | 50,000 | Screen printing | 170 | 100,000 sec or more and ∞ or less |
| Example 3 | Substrate-2 | P-3 | 18 | 50,000 | P-6 | 18 | 50,000 | Screen printing | 170 | 100,000 sec or more and ∞ or less |
| Example 4 | Substrate-3 | P-3 | 18 | 50,000 | P-6 | 18 | 50,000 | Screen printing | 170 | ∞ |
| Example 5 | Substrate-3 | P-4 | 18 | 50,000 | P-7 | 18 | 50,000 | Screen printing | 170 | ∞ |
| Example 6 | Substrate-3 | P-5 | 5 | 12 | P-6 | 5 | 12 | InkJet printing | 170 | 100,000 sec or more and ∞ or less |
| Example 7 | Substrate-3 | P-3 | 15 | 3000 | P-6 | 15 | 3000 | Needle dispenser printing | 170 | ∞ |
| Example 8 | Substrate-4 | P-3 | 18 | 50,000 | P-6 | 18 | 50,000 | Screen printing | 170 | ∞ |
| Comparative Example 1 | Substrate-5 | P-3 | 17 | 50,000 | P-6 | 17 | 50,000 | Screen printing | 170 | 1000 |
| Comparative Example 2 | Substrate-6 | P-3 | 17 | 50,000 | P-6 | 17 | 50,000 | Screen printing | 170 | 100,000 sec or more and ∞ or less |
| Comparative Example 3 | Substrate-6 | P-3 | 17 | 50,000 | P-6 | 17 | 50,000 | Screen printing | 170 | 100,000 sec or more and ∞ or less |

*)In measurement of air permeability,"∞ or less" refers to a measuring limit or less, and ∞ denotes a value beyond the measuring limit.

TABLE 7

| | Domain size | | Layer thickness | | | Porosity | | Strength in water (kg/15 mm) |
|---|---|---|---|---|---|---|---|---|
| | Wc (μm) | Wa (μm) | Porous supporting layer (A) (μm) | Porous intermediate layer (B) (μm) | Charge-mosaic layer (C) (μm) | Porous supporting layer (A) (%) | Porous intermediate layer (B) (%) | |
| Example 1 | 100 | 100 | 76 | 3.7 | 4.5 | 70 | 58 | 3 |
| Example 2 | 100 | 100 | 76 | 3.7 | 3.5 | 70 | 58 | 3 |
| Example 3 | 100 | 100 | 67 | 3.2 | 3.5 | 66 | 52 | 3 |
| Example 4 | 100 | 100 | 62 | 2.7 | 3.5 | 63 | 43 | 3 |
| Example 5 | 100 | 100 | 62 | 2.7 | 3.5 | 63 | 43 | 3 |
| Example 6 | 100 | 100 | 62 | 2.7 | 3.5 | 63 | 43 | 3 |
| Example 7 | 100 | 100 | 62 | 2.7 | 4 | 63 | 43 | 3 |
| Example 8 | 100 | 100 | 58 | 2.9 | 3.5 | 60 | 46 | 3 |
| Comparative Example 1 | 100 | 100 | 76 | — | 3.5 | 70 | — | 3 |
| Comparative Example 2 | 100 | 100 | 26 | — | 3.5 | 11 | — | 3 |
| Comparative Example 3 | 100 | 100 | 26 | — | 3.5 | 11 | — | 3 |

| | Density | | Piezodialysis test | | | | |
|---|---|---|---|---|---|---|---|
| | Porous supporting layer (A) (g/cm$^3$) | Porous intermediate layer (B) (g/cm$^3$) | NaCl concentration (ppm) | Pressure (MPa) | Jw[1] | Js[1] | α[2] |
| Example 1 | 0.39 | 0.54 | 10000 | 1.5 | 84 | 0.3 | 280 |
| Example 2 | 0.39 | 0.54 | 10000 | 1.5 | 55 | 0.9 | 61 |
| Example 3 | 0.46 | 0.67 | 10000 | 1.5 | 43 | 1.1 | 39 |
| Example 4 | 0.52 | 0.83 | 35000 | 3.5 | 25 | 1.5 | 17 |
| Example 5 | 0.52 | 0.83 | 35000 | 3.5 | 28 | 1.3 | 22 |
| Example 6 | 0.52 | 0.83 | 10000 | 1.5 | 60 | 0.9 | 67 |
| Example 7 | 0.52 | 0.83 | 35000 | 3.5 | 30 | 1.3 | 23 |
| Example 8 | 0.56 | 0.8 | 35000 | 3.5 | 29 | 1.4 | 21 |
| Comparative Example 1 | 0.39 | — | 10000 | 1.5 | Unmeasurable due to leakage of a test solution from the pressing side | | |
| Comparative Example 2 | 2.31 | — | 10000 | 1.5 | 0.25 | 0.015 | 17 |
| Comparative Example 3 | 2.31 | — | 35000 | 3.5 | Unmeasurable due to leakage of a test solution from the pressing side | | |

[1]Unit: $10^{-2}$ mol·m$^{-2}$·s$^{-1}$
[2]α = Jw/Js

The results in Table 4 show that the porous intermediate layer (B) formed on the porous supporting layer (A) improves smoothness while keeping air permeability low in the multilayer structure (D) produced by forming the porous intermediate layer (B) on the porous supporting layer (A) (substrate-1 to substrate-4). In particular, it is shown that further smoothness can be achieved by the hot-pressing (substrate-2 to substrate-4). On the other hand, without the porous intermediate layer (B), air permeability is low and smoothness is also lower (substrate-5). Although smoothness can be improved by hot-pressing even without the porous intermediate layer (B), air permeability is increased at the same time (substrate-6).

The results in Tables 6 and 7 show that a multilayered charge-mosaic membrane produced has a large salt permeation flux and an excellent electrolyte permselectivity by forming the porous intermediate layer (B) on the porous supporting layer (A) and printing a cationic-group containing polyvinyl alcohol or a mixture of a cationic-group containing polymer and a cationic-group free polyvinyl alcohol on the porous intermediate layer (B) while printing an anionic-group containing polyvinyl alcohol or a mixture of an anionic-group containing polymer and an anionic-group free polyvinyl alcohol on the porous intermediate layer (B) (Examples 1 to 8). In particular, when the substrate which is hot-pressed after forming the porous intermediate layer (B) is used, and the charge-mosaic layer (C) is printed using a high-viscosity ink, a multilayer membrane with less defects such as microvoids in a printed layer is obtained, allowing for a piezodialysis test with a high pressure. Furthermore, it is shown that a salt permeation flux is increased and electrolyte permselectivity is improved (Examples 4 to 5 and 7 to 8).

On the other hand, without the porous intermediate layer (B) on the porous supporting layer (A), the charge-mosaic layer (C) was broken on a pinhole in the porous supporting layer (A), leading to leakage of a test liquid, due to which a piezodialysis test failed to be conducted (Comparable Example 1). When a piezodialysis test was conducted under the conditions of NaCl concentration: 10000 ppm and pressure: 1.5 MPa using a substrate without the porous intermediate layer (B) whose smoothness had been improved by hot-pressing, a salt permeation flux was considerably small (Comparative Example 2). Furthermore, when a piezodialysis test was conducted under the conditions of NaCl concentration: 35000 ppm and pressure: 3.5 MPa, leakage of a test liquid occurred due to breakage of the charge-mosaic layer (C), so that the piezodialysis test failed (Comparative Example 3).

Example 9

(Production of a Multilayered Charge-Mosaic Membrane)

In a 200 mL Erlenmeyer flask were placed 90 mL of deionized water and then 22.5 g of the cationic polymer P-1, and then the mixture was heated in a water bath at 95° C., to dissolve the polymer P-1. Then, to the mixture was added deionized water to prepare an aqueous solution of the cationic polymer at a concentration of 17%. The viscosity of the solution was 87,000 mPa·s (20° C.). In a separate 200 mL Erlenmeyer flask were placed 90 mL of deionized water and then 22.5 g of the anionic polymer P-2, and then the mixture was heated in a water bath at 95° C., to dissolve the polymer P-2. Then, to the mixture was added deionized water to prepare an aqueous solution of the anionic polymer at a concentration of 17%. The viscosity of the solution was 85,000 mPa·s (20° C.). First, the aqueous solution of the cationic polymer P-1 was applied on substrate-7 using a screen printer LS-34TV (Newlong Seimitsu Kogyo Co., Ltd.) to print the We regions in the striped print shown in FIG. 2 (printing area: 10 cm×10 cm). The printed matter was dried in a hot-air dryer at 50° C. for 10 min. Then, likewise, the aqueous solution of the anionic polymer P-2 was applied by the screen printer to print the Wa regions shown in FIG. 2, and the printed matter was dried in a hot-air dryer at 50° C. for 10 min. For the multilayered charge-mosaic membrane thus produced, a thickness of the charge-mosaic layer (C) measured by a shape measurement microscope VK-970 (Keyence Corp.) was 6 μm. Here, a thickness of the porous supporting layer (A) was 65 μm and a thickness of the porous intermediate layer (B) was 3 μm. Using the measurement sample obtained, air permeability was measured as described above. The results obtained are shown in Table 9.

The multilayered charge-mosaic membrane thus obtained was annealed using a hot-air dryer at 170° C. for 30 min, to form physical crosslinking. Subsequently, the film was immersed in a 2 mol/L aqueous solution of an electrolyte, sodium sulfate for 24 hours. To the aqueous solution was added concentrated sulfuric acid to adjust the pH of the aqueous solution to 1, and then the film was immersed in a 0.1% by volume aqueous solution of glutaraldehyde, which was then stirred by a stirrer at 25° C. for 24 hours to conduct crosslinking. Here, the aqueous solution of glutaraldehyde was prepared by diluting glutaraldehyde (25% by volume) from Ishizu Chemicals Co. with water. After the crosslinking, the film was immersed in deionized water until the film reached swelling equilibrium, during which deionized water was replaced several times. Table 8 summarizes the above producing process.

(Evaluation of a Multilayered Charge-Mosaic Membrane)

The multilayered charge-mosaic membrane thus produced was cut into pieces with a desired size, which were used as samples for measurement. The measurement samples obtained were subjected to a strength-in-water test and a piezodialysis test according to the above-described method. The results obtained are shown in Table 9.

Examples 10 to 14

A multilayered charge-mosaic membrane was produced and evaluated as described in Example 9, replacing the types of a cationic and an anionic polymers used, concentrations of aqueous solutions of a cationic and an anionic polymers prepared, the type of a substrate and a domain size by those described in Table 8. The production process and the results are shown in Tables 8 and 9, respectively.

Example 15

A multilayered charge-mosaic membrane was produced and evaluated as described in Example 9, substituting a 5% aqueous solution of a cationic polymer prepared from the cationic polymer P-5 for the cationic polymer P-1, a 5% aqueous solution of an anionic polymer prepared from the anionic polymer P-7 for the anionic polymer P-2, and an ink-jet printer for the screen printer. The production process and the results are shown in Tables 8 and 9, respectively. Here, the ink-jet printer was "NanoPrinter 1100D" from Microjet Corporation. The aqueous solution of a cationic polymer had a viscosity of 12 mPa·s (20° C.) and the aqueous solution of an anionic polymer had a viscosity of 12 mPa·s (20° C.)

Example 16

A multilayered charge-mosaic membrane was produced and evaluated as described in Example 9, substituting a 15% aqueous solution of a cationic polymer prepared from the cationic polymer P-3 for the cationic polymer P-1, a 15% aqueous solution of an anionic polymer prepared from the anionic polymer P-6 for the anionic polymer P-2, and a dispenser printer for the screen printer. The production process and the results are shown in Tables 8 and 9, respectively. Here, the dispenser printer was "SHOTMASTER500" from Musashi Engineering Inc. The 15% aqueous solution of the cationic polymer P-3 had a viscosity of 3000 mPa·s (20° C.), and the 15% aqueous solution of the anionic polymer P-6 had a viscosity of 3000 mPa·s (20° C.).

TABLE 8

| | | Cationic polymer domain | | | Anionic polymer domain | | | | | | | |
|---|---|---|---|---|---|---|---|---|---|---|---|---|
| | Substrate | Cationic polymer | Concentration of polymer aqueous solution (wt %) | Viscosity of polymer aqueous solution (mPa·s) | Anionic polymer | Concentration of polymer aqueous solution (wt %) | Viscosity of polymer aqueous solution (mPa·s) | Printing method | Domain size Wc (μm) | Domain size Wa (μm) | Annealing Temperature (° C.) | Air permeability (sec) |
| Example 9 | Substrate-7 | P-1 | 17 | 87,000 | P-2 | 17 | 85,000 | Screen printing | 80 | 80 | 170 | ∞ |
| Example 10 | Substrate-8 | P-1 | 17 | 87,000 | P-2 | 17 | 85,000 | Screen printing | 80 | 80 | 170 | ∞ |
| Example 11 | Substrate-8 | P-3 | 18 | 50,000 | P-6 | 18 | 50,000 | Screen printing | 80 | 80 | 170 | ∞ |
| Example 12 | Substrate-9 | P-3 | 18 | 50,000 | P-6 | 18 | 50,000 | Screen printing | 80 | 80 | 170 | ∞ |
| Example 13 | Substrate-9 | P-3 | 18 | 50,000 | P-6 | 18 | 50,000 | Screen printing | 50 | 50 | 170 | 900,000 sec |

TABLE 8-continued

| | | Cationic polymer domain | | | Anionic polymer domain | | | | | | |
|---|---|---|---|---|---|---|---|---|---|---|---|
| | | Cat-ionic poly-mer | Concentration of polymer aqueous solution (wt %) | Viscosity of polymer aqueous solution (mPa·s) | An-ionic poly-mer | Concentration of polymer aqueous solution (wt %) | Viscosity of polymer aqueous solution (mPa·s) | Printing method | Domain size | | Anneal-ing Temper-ature (°C.) | Air perme-ability (sec) |
| | Substrate | | | | | | | | Wc (μm) | Wa (μm) | | |
| Example 14 | Substrate-10 | P-4 | 18 | 50,000 | P-6 | 18 | 50,000 | Screen printing | 50 | 50 | 170 | ∞ |
| Example 15 | Substrate-10 | P-5 | 5 | 12 | P-7 | 5 | 12 | InkJet printing | 80 | 80 | 170 | 500,000 sec |
| Example 16 | Substrate-10 | P-3 | 15 | 3000 | P-6 | 15 | 3000 | Needle dis-penser printing | 80 | 80 | 170 | ∞ |

TABLE 9

| | Layer thickness | | | Porosity | | | Piezodialysis test | | | | |
|---|---|---|---|---|---|---|---|---|---|---|---|
| | Porous supporting layer (A) (μm) | Porous intermediate layer (B) (μm) | Charge-mosaic layer (C) (μm) | Porous supporting layer (A) (vol %) | Porous intermediate layer (B) (vol %) | Strength in water (kg/15 mm) | NaCl concentration (ppm) | Pressure (MPa) | Jw[1] | Js[1] | α[2] |
| Example 9 | 65 | 3 | 6 | 64 | 53 | 7.0 | 10000 | 1.5 | 55 | 1.1 | 50 |
| Example 10 | 65 | 3 | 6 | 64 | 53 | 7.0 | 10000 | 1.5 | 84 | 0.4 | 221 |
| Example 11 | 65 | 3 | 6 | 64 | 53 | 7.0 | 10000 | 1.5 | 55 | 1.1 | 50 |
| Example 12 | 65 | 2.5 | 6 | 64 | 64 | 7.0 | 35000 | 3.5 | 43 | 1.4 | 31 |
| Example 13 | 65 | 2.5 | 6 | 64 | 64 | 7.0 | 35000 | 3.5 | 25 | 2.5 | 10 |
| Example 14 | 70 | 3 | 6.5 | 61 | 43 | 5.5 | 35000 | 3.5 | 28 | 2.6 | 11 |
| Example 15 | 70 | 3 | 6.5 | 61 | 43 | 5.5 | 35000 | 3.5 | 60 | 1.1 | 54 |
| Example 16 | 70 | 3 | 6.5 | 61 | 43 | 5.5 | 35000 | 3.5 | 30 | 1.6 | 19 |

[1] Unit: $10^{-2}$ mol·m$^{-2}$·s$^{-1}$
[2] α = Jw/Js

The results for substrate-7 to substrate-10 in Table 5 show that the porous intermediate layer (B) formed on the porous supporting layer (A) improves smoothness while keeping air permeability low in the multilayer structure (D) produced by forming the porous intermediate layer (B) on the porous supporting layer (A). In particular, it is shown that further smoothness can be achieved by the hot-pressing (substrate-7 to substrate-10). Furthermore, it is shown that by forming the porous supporting layer (A) from a hydrophobic fiber, a shrinking percentage after immersion in water and drying is reduced and dimensional stability is improved (substrate-7 to substrate-10).

The results in Tables 8 and 9 show that a multilayered charge-mosaic membrane produced exhibits improved strength in water and has a large salt permeation flux and an excellent electrolyte permselectivity by forming the porous intermediate layer (B) on the porous supporting layer (A) made of a hydrophobic fiber and printing a cationic-group containing polyvinyl alcohol or a mixture of a cationic-group containing polymer and a cationic-group free polyvinyl alcohol on the porous intermediate layer (B) while printing an anionic-group containing polyvinyl alcohol or a mixture of an anionic-group containing polymer and an anionic-group free polyvinyl alcohol on the porous intermediate layer (B) (Examples 9 to 16). In particular, it is shown that when a domain size is small, a salt permeation flux becomes larger and electrolyte permselectivity is improved (Examples 13 to 14). Furthermore, it is shown that even when a domain size is less than 100 an air permeability of 500,000 sec or more is obtained (Examples 9 to 16). In particular, it is shown that when the substrate which is hot-pressed after forming the porous intermediate layer (B) is used, and the charge-mosaic layer (C) is printed using a high-viscosity ink, a multilayer membrane with less defects such as microvoids in a printed layer is obtained, resulting in high air permeability (Examples 9 to 14 and 16).

DESCRIPTION OF SYMBOLS

1: nitrogen-gas cylinder
2: pressure gauge
3: multilayered charge-mosaic membrane
4: stirring bar
5: conductivity meter
6: Cell I
7: Cell II
8: porous supporting layer (A)
9: porous intermediate layer (B)
10: charge-mosaic layer (C)
Wc: domain size of cationic polymer
Wa: domain size of anionic polymer

The invention claimed is:
1. A multilayered charge-mosaic membrane, comprising:
(A) a porous supporting layer (A) comprising, in layer form, fibers having an average fiber diameter of 1 μm or more and 100 μm or less;
(B) a porous intermediate layer (B) comprising, in layer form, fibers having an average fiber diameter of 0.01 μm or more and less than 1 μm; and

(C) a charge-mosaic layer (C) comprising cationic polymer domains and anionic polymer domains, wherein the cationic polymer domains comprise a cationic polymer and the anionic domains comprise an anionic polymer, wherein:

the layers are located in the following order: the porous supporting layer (A), the porous intermediate layer (B) and the charge-mosaic layer (C), or the charge-mosaic layer (C) is formed within the porous intermediate layer (B);

the porous supporting layer (A), the porous intermediate layer (B), or both, comprises a fiber layer comprising hydrophilic fibers in at least 50% by weight;

the porous intermediate layer (B) has a thickness of 0.1 to 100 µm;

a porosity of the porous supporting layer (A) is larger than a porosity the porous intermediate layer (B);

the charge-mosaic layer (C) has a charge structure which comprises the cationic polymer domains and anionic polymer domains which are alternately aligned in a first horizontal direction and each of the alternately aligned cationic polymer domains and anionic polymer domains continuously extend from one side of the charge-mosaic layer (C) to the other side of the charge-mosaic layer (C) in a second horizontal direction which is perpendicular to the first horizontal direction; and both of the cationic polymer and the anionic polymer, constituting the charge-mosaic layer (C), are a block copolymer comprising a polymer block comprising an ionic group and a vinyl alcohol polymer block.

2. The multilayered charge-mosaic membrane of claim 1, wherein the hydrophilic fibers are a polyvinyl alcohol fiber.

3. The multilayered charge-mosaic membrane of claim 1, wherein the porous supporting layer (A) comprises a hydrophobic polymer.

4. The multilayered charge-mosaic membrane of claim 3, wherein the hydrophobic polymer is at least one selected from the group consisting of a polyolefin, a polyester and a polyamide.

5. The multilayered charge-mosaic membrane of claim 1, wherein the porous supporting layer (A) comprises a fiber layer comprising a hydrophobic polymer in at least 50% by weight and the porous intermediate layer (B) comprises a fiber layer comprising a hydrophilic fiber in at least 50% by weight.

6. A method for manufacturing the multilayered charge-mosaic membrane of Claim the method comprising forming the porous intermediate layer (B) on the porous supporting layer (A) and then forming the charge-mosaic layer (C) on the porous intermediate layer (B) by printing.

7. The method of claim 6, wherein after the charge-mosaic layer (C) is formed on the porous intermediate layer (B) by the printing, an annealing, cross-linking, or both, is conducted.

8. The multilayered charge-mosaic membrane of claim 2, wherein the porous supporting layer (A) comprises a hydrophobic polymer.

9. The multilayered charge-mosaic membrane of claim 8, wherein the hydrophobic polymer is at least one selected from the group consisting of a polyolefin, a polyester and a polyamide.

10. The multilayered charge-mosaic membrane of claim 2, wherein the porous supporting layer (A) comprises, in layer form, a fiber layer comprising a hydrophobic polymer in at least 50% by weight and the porous intermediate layer (B) comprises, in layer form, a fiber layer comprising a hydrophilic fiber in at least 50% by weight.

\* \* \* \* \*